(12) United States Patent
Cociglio

(10) Patent No.: US 9,699,062 B2
(45) Date of Patent: Jul. 4, 2017

(54) PERFORMANCE MEASUREMENT OF A LINK OF A PACKET-SWITCHED COMMUNICATION NETWORK

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 51 days.

(21) Appl. No.: 14/893,415

(22) PCT Filed: May 31, 2013

(86) PCT No.: PCT/EP2013/061270
§ 371 (c)(1),
(2) Date: Nov. 23, 2015

(87) PCT Pub. No.: WO2014/191048
PCT Pub. Date: Dec. 4, 2014

(65) Prior Publication Data
US 2016/0105353 A1    Apr. 14, 2016

(51) Int. Cl.
*H04L 12/26* (2006.01)
(52) U.S. Cl.
CPC .......... *H04L 43/50* (2013.01); *H04L 43/087* (2013.01); *H04L 43/0829* (2013.01);
(Continued)
(58) Field of Classification Search
CPC . H04L 43/50; H04L 43/0829; H04L 43/0852; H04L 43/087; H04L 43/0858;
(Continued)

(56) References Cited

U.S. PATENT DOCUMENTS 5,343,463 A *  8/1994  van Tetering ........... H04L 43/50
                                                   370/253
8,483,081 B2 *  7/2013  Wang ...................... H04L 1/20
                                                   370/252
(Continued)

FOREIGN PATENT DOCUMENTS

EP       1 406 413 A2    4/2004
WO    WO 2010/072251 A1  7/2010
(Continued)

OTHER PUBLICATIONS

International Search Report Issued Aug. 9, 2013 in PCT/EP2013/061270.
(Continued)

*Primary Examiner* — Afsar M Qureshi
(74) *Attorney, Agent, or Firm* — Oblon, McClelland, Maier & Neustadt, L.L.P.

(57) ABSTRACT

A method for performing a performance measurement of a link between two nodes of a communication network. Before starting a measurement, measurement mode information including start time and packet transmission rate are provided to both nodes. At the start time, a first node generates and transmits to the other node a packet flow including packets with transmission times determined by the start time and packet transmission rate. The packet flow is divided into alternating blocks transmitted during even and odd block periods. At each block period, while the packet flow is received, a variable indicative of its behavior is updated by using the measurement mode information and detected information on reception of the packet flow. Then, a parameter indicative of a performance of the packet flow during the block period is calculated using the value reached by the variable at the end of the block period.

18 Claims, 10 Drawing Sheets

(52) U.S. Cl.
CPC ...... *H04L 43/0852* (2013.01); *H04L 43/0858* (2013.01); *H04L 43/0864* (2013.01); *H04L 43/16* (2013.01)

(58) Field of Classification Search
CPC .... H04L 43/0864; H04L 43/16; H04W 12/06; H04W 84/12; H04W 4/008; H04W 8/005
USPC .......................................................... 370/252
See application file for complete search history.

(56) References Cited

U.S. PATENT DOCUMENTS

| | | | | |
|---|---|---|---|---|
| 2003/0046388 | A1* | 3/2003 | Milliken | H04L 41/046 709/224 |
| 2005/0005004 | A1 | 1/2005 | Sugauchi et al. | |
| 2008/0049757 | A1* | 2/2008 | Bugenhagen | H04L 12/2602 370/395.1 |
| 2008/0259809 | A1* | 10/2008 | Stephan | H04L 41/142 370/252 |
| 2011/0063988 | A1* | 3/2011 | Lee | H04L 41/5009 370/252 |
| 2011/0255440 | A1 | 10/2011 | Cociglio et al. | |
| 2012/0275333 | A1 | 11/2012 | Cociglio | |

FOREIGN PATENT DOCUMENTS

| | | |
|---|---|---|
| WO | WO 2011/079857 A1 | 7/2011 |
| WO | WO 2012/059138 A1 | 5/2012 |

OTHER PUBLICATIONS

S. Shalunov, et al., "A One-way Active Measurement Protocol (OWAMP)" The Internet Society, XP015047408, Sep. 2006, 56 Pages.

A. Tempia Bonda, et al., "A packet-based method for passive performance monitoring; draft-tempia-opsawg-p3m-01.txt" IETF Trust, XP015078988, Oct. 28, 2011, 23 Pages.

M. Cociglio, et al., "A method for IP multicast performance monitoring; draft-cociglio-mboned-multicast-pm-01.txt" IETF Trust, XP015072143, Oct. 22, 2010, 23 Pages.

M. Chen, et al., "Coloring based IP Flow Performance Measurement Framework; draft-chen-coloring-based-ipfpm-framework-00" IETF Trust, XP015090106, Feb. 17, 2013, 13 Pages.

* cited by examiner

PERFORMANCE MEASUREMENT OF A LINK OF A PACKET-SWITCHED COMMUNICATION NETWORK

TECHNICAL FIELD

The present invention relates to the field of communication networks. In particular, the present invention relates to a method for performing a performance measurement (in particular, a packet loss measurement and/or a delay measurement and/or a jitter measurement) of a link between two measurement points in a packet-switched communication network. Further, the present invention relates to nodes and computers for communication network configured to implement such a method, and to computer networks comprising such nodes and computers.

BACKGROUND ART

In a packet-switched communication network, data are transmitted in the form of packets that are routed from a source node to a destination node through possible intermediate nodes. Exemplary packet-switched networks are IP (Internet Protocol) networks, Ethernet networks and MPLS (Multi-Protocol Label Switching) networks.

Packets not always reach the destination node, i.e. they may be lost during transmission through the network. Loss of packets is due to different reasons. For instance, a node or link may fail, thereby causing a total packet loss until the failure is either bypassed or fixed. Alternatively, packets may be discarded by a node due to a congestion of its ports. Besides, packets may be discarded by a node since they contain bit errors. In any case, when providing a service by transmitting data through a packet-switched network, the rate of packets lost during transmission affects the quality of service (QoS) of that service.

Besides, a packet is transmitted at a transmission time by the source node and is received at a reception time by the destination node. The time elapsing between transmission time and reception time is typically called "one-way delay". The one-way delay of a packet is given by the following equation:

$$OWD = Trx - Ttx, \quad [1]$$

where Trx is the transmission time and Ttx is the reception time of the packet. The one-way delay of a packet mainly depends on the number of possible intermediate nodes crossed by the packet from source to destination, the permanence time of the packet at each node and the propagation time along the links. Since the packets are routed hop-by-hop by each node, both the number of possible intermediate nodes crossed by packets and the permanence time of packets at each node are unpredictable. Accordingly, the one-way delay of a packet is almost unpredictable.

Besides, packets of a same packet flow may have different one-way delays. The difference in the one-way delays of two packets of a same data flow is termed "one-way interarrival jitter" (or, briefly, "one-way jitter"). In particular, if Ttx1 and Ttx2 are the transmission times for a first packet and a second packet, and Trx1 and Trx2 are the reception times for the first packet and the second packet, the one-way jitter may be expressed as:

$$OWJ = (Trx1 - Trx2) - (Ttx1 - Ttx2). \quad [2]$$

When a communication service (in particular, a real-time voice or data service such as call, conference call, video conference, etc.) is provided by means of a packet-switched network, a measurement of packet loss, one-way delay and one-way jitter affecting the packet flow carrying the service provides an indication of the quality of service (QoS) perceived by the end users of the service. Therefore, measuring packet loss, one-way delay and/or one way-jitter of packet flows in a communication network is of particular interest for network operators.

WO 2010/072251 (in the name of the same Applicant) discloses a method for measuring data loss of a data flow transmitted through a communication network from a transmitting node to a receiving node. Before transmitting the data units of the data flow, the transmitting node marks each data unit for dividing the data flow in blocks. In particular, the transmitting node marks each data unit by setting a bit of its header to "1" or "0". The marking results in a sequence of blocks, where blocks of data units marked with "1" alternate in time with blocks of data units marked with "0". The blocks may have a same duration termed "block period" Tb (e.g. 5 minutes). Further, the transmitting node increases by one a first counter C1 each time a data unit marked by "1" is transmitted, and a second counter C0 each time a data unit marked by "0" is transmitted. The marked data units are then received at the receiving node. Each time the receiving node receives a data unit, it checks its marking, increases a third counter C'1 if the marking is "1" and increases a fourth counter C'0 if the marking is "0". The values of the counters C1, C0, C'1 and C'0 are periodically detected and the detected values are used for calculating the data loss at each block period.

WO 2011/079857 (in the name of the same Applicant) discloses a method for performing a time measurement (in particular, for measuring one-way delay and/or one-way jitter) on a data flow transmitted from a transmitting node to a receiving node of a communication network. According to WO 2011/079857, at the transmitting node, in addition to the above marking operation disclosed by WO 2010/072251, a transmission timestamp is also generated at each block period, which indicates the time at which a predetermined data unit of the current block (for instance, the first data unit of the current block) is transmitted. At the receiving node, a reception timestamp is generated at each block period, which indicates the time at which the predetermined data unit of the current block is received. At each block period, the transmission and reception timestamps are used for calculating the one-way delay affecting the predefined data unit of the current block. Transmission and reception timestamps generated for consecutive data units allow calculation of the one-way jitter.

Instead of measuring one-way delay and one-way jitter, it is known measuring two-way delay and two-way jitter of packets transmitted back and forth along a bidirectional link between two nodes. Two-way measurements are inherently more accurate than one-way measurements, since they are immune to lack of synchronization between the two nodes. These measurements are typically carried out on ad hoc packets, namely artificial packets specifically generated by one of the two nodes for carrying out the measurement.

Two-way delay and two-way jitter in IP networks are typically measured by applying the known Ping function to ad hoc packets based on the known protocol ICMP (Internet Control Message Protocol) defined by RFC 792 (September 1981). The Ping function provides for generating a sequence of ICMP packets at one of the two nodes. Each ICMP packet includes a packet sequence number and a transmission timestamp indicating the time at which the ICMP packet is transmitted. Each ICMP packet is then transmitted back and forth along the link. Upon reception of each ICMP packet at the same node which originated it, a reception timestamp is generated. The packet sequence number allows identifying the received packets and detecting possible reception sequence errors. The transmission and reception timestamps allow calculating two-way delay and jitter.

Furthermore, the known protocols OWAMP (One-Way Active Measurement Protocol) defined by RFC 4656 (September 2006) and TWAMP (Two-Way Active Measurement Protocol) defined by RFC 5357 (October 2008) allow performing one-way measurements and two-way measurements, respectively, in IP networks on artificial packets similar to "real" packets (namely, packets actually carrying user traffic). Differently from the Ping function, the TWAMP protocol provides for inserting into each artificial packet two further timestamps at the remote node: a timestamp indicating the time at which the packet is received at the remote node and a timestamp indicating the time at which the packet is retransmitted by the remote node. This allows taking into account the processing time of the packets at the remote node in the two-way delay and jitter calculation.

SUMMARY OF THE INVENTION

The Applicant has noticed that measuring packet loss, delay and/or jitter on artificial packets rather than on real packets has a number of advantages.

First of all, the transmission rate of real packets is typically variable in a non predictable way and, accordingly, it is not possible to predict whether the computational resources available at the nodes or computers responsible of carrying out the measurements on such packets will be sufficient to execute the measurements. Performing the measurements on artificial packets instead allows adapting the packet transmission rate to the amount of computational resources available at the nodes or computers performing the measurement.

Moreover, real packets may be prone to reception sequence error, which may impair the measurement accuracy. Use of artificial packets instead allows to suitably select the transmission rate (or the inter-transmission time of consecutive packets) of the artificial packets so as to prevent any reception sequence error.

Furthermore, performing measurements on real packets typically requires modifying the packets (in particular, the packet header) so as to include information needed to carry out the measurements. Such modifications are however subject to very narrow constraints, since the packet format is typically defined by international standards. Artificial packets may be instead customized/adapted in a very flexible way so as to include all the information needed to carry out the measurements. For instance, such information may be inserted into the header as well as into the payload of the packets. On the other hand, when artificial packets are used for measurement purposes, real packets carrying user traffic are advantageously left unchanged.

Moreover, real packets may be subject to changes (e.g. changes of destination or source address) decided by the clients, which may make the nodes which are responsible of carrying out the measurements unable to identify the packets to be measured. Such changes shall be notified to the network operator, who is otherwise unable to properly reconfigure the nodes. Using artificial packets instead allows the network operator to control directly all the aspects relating to the measurements, in particular the features of the packets to be measured.

The known techniques for measuring delay and/or jitter based on artificial packets mentioned above (namely, Ping and OWAMP/TWAMP) provide the above advantages but, on the other hand, exhibit further drawbacks.

As to the known Ping function, it may be applied only to packets based on the known protocol ICMP. Furthermore, it provides only two-way delay and two-way jitter measurements. Moreover, it is quite inaccurate, since the two-way delay and jitter measurements do not take into account the processing time of the artificial packets at the remote node.

As to the known protocols OWAMP/TWAMP, OWAMP provides for one-way measurements and TWAMP allows taking into account the processing time of the artificial packets at the remote node. As mentioned above, this latter feature is implemented according to TWAMP by inserting two additional timestamps in each artificial packet upon its reception and retransmission at the remote node. The insertion and processing of such additional timestamps and the packet sequence numbers however disadvantageously increases the computational effort at the nodes involved in the measurement. Moreover, measurements based on OWAMP/TWAMP are inherently inaccurate in that an unpredictable mismatch exists between the transmission timestamp generated by the originating node (and also by the remote node, in TWAMP) and the time at which the packet is actually transmitted.

Moreover, neither the Ping function nor the protocols OWAMP/TWAMP allow performing intermediate performance measurements, namely performance measurements on a portion of the link between the node originating the artificial packets and the remote node which receives and re-transmits them.

In view of the above, the Applicant has tackled the problem of providing a method for performing a performance measurement on a link between two measurement points (nodes or computers) in a packet-switched communication network based on artificial traffic, which overcomes at least one of the aforesaid drawbacks, namely which provides more accurate measurements than Ping and OWAMP/TWAMP and which enables intermediate performance measurements on one or more portions of the link.

In the following description and in the claims, the expression "artificial packets" or "ad hoc packets" will designate packets which are expressly originated and transmitted for measurement purposes, and that accordingly do not carry any user traffic. Such artificial packets may be formatted according to any known protocol, in particular any known protocol of the transport layer or layer 4 of the TCP/IP protocol stack or ISO-OSI. For instance, the artificial packets may be formatted according to the known UDP (User Datagram Protocol) of the TCP/IP protocol stack.

Besides, in the following description and in the claims, the term "link" will designate a connection between two nodes of a communication network, wherein such connection may be either a physical connection or a logical connection, possibly comprising a number of intermediate nodes and/or one or more intermediate networks.

Furthermore, in the following description and in the claims, the expression "performing a performance measurement of a link" will designate an operation of measuring:

a packet loss induced on a packet flow transmitted over the link;

a one-way delay or a two-way delay induced on packets of said packet flow by transmission over the link; and/or a one-way jitter or a two-way jitter induced on a pair of packets by transmission over the link.

Besides, in the following description and in the claims, the expression "marking a packet" will designate an operation of setting a feature of the packet to a predefined marking value, in particular to one of at least two alternative marking values. For instance, the operation of marking a packet may comprise the operation of setting one or more bits of the packet (e.g. one bit or a bit sequence of its header) to one of at least two predefined alternative marking values, the operation of setting its frequency or its phase to one of at least two predefined alternative marking values, and so on.

According to a first aspect, the present invention provides a method for performing a performance measurement of a link connecting a first node and a second node of a communication network, the method comprising:
a) before starting a performance measurement, providing the first node and the second node with measurement mode information comprising at least a measurement start time and a packet transmission rate;
b) at the measurement start time, generating and transmitting a packet flow from the first node to the second node, the packet flow comprising a plurality of packets whose transmission times are determined by the measurement start time and the packet transmission rate, the generating and transmitting comprising generating and transmitting first packets during first block periods and second packets during second block periods which alternate in time with the first block periods;
c) at a block period of the first block periods or second block periods, while the packet flow is received at the second node, updating a variable indicative of a behaviour of the packet flow during the block period, by using the measurement mode information and detected information on reception of the packet flow; and
d) at a subsequent block period of the first block periods or second block periods, calculating a parameter indicative of a performance of the packet flow during the block period using a value reached by the variable at the end of the block period.

Preferably, step b) comprises marking the first packets by a first marking value and marking the second packets by a second marking value.

More preferably, each packet of the packet flow comprises a marking field, the marking field being set to the first marking value in the first packets and to the second marking value in the second packets, the marking field being comprised in one of header or payload of the packet.

The packet transmission rate is constant or variable in time according to a predefined traffic profile.

Preferably, at step a) the measurement mode information further comprises a block period duration Tb and, at step b), the first block periods and the second block periods have a duration equal to the block period duration Tb.

Profitably, at step a) the measurement mode information further comprises a packet type and, at step b), the packets are of the packet type.

According to advantageous embodiments, at step a), the measurement mode information further comprises performance measurement type selected amongst: packet loss measurement, one-way delay measurements, one-way jitter measurements and two-way delay measurements.

Preferably:
step c) further comprises counting a number of packets of the packet flow received at the second node during the block period; and
at step d), calculating comprises calculating a number of packets of the packet flow transmitted by the first node during the block period based on the packet transmission rate comprised in the measurement mode information, and calculating a packet loss undergone by the packet flow during the block period based on the calculated number of packets of the packet flow transmitted by the first node during the block period and the counted number of packets of the packet flow received at the second node during the block period ($T(k)$).

According to embodiments:
at step c), updating comprises, upon reception of each packet of the packet flow during the block period, detecting a respective reception time, calculating a respective transmission time based on the measurement start time and the packet transmission rate comprised in the measurement mode information, and calculating a respective one-way delay as a difference between the detected reception time and the calculated transmission time;
at step c), updating comprises, upon reception of each packet of the packet flow during the block period, using the respective one-way delay for updating at least one of: a cumulative one-way delay, a maximum one-way delay variable, a minimum one-way delay variable, and a threshold delay counter; and
at step d), calculating comprises using a value reached at the end of the block period by at least one of: the cumulative one-way delay, the maximum one-way delay variable, the minimum one-way delay variable and the threshold delay counter for calculating at least one of: an average one-way delay of the packet flow during the block period, a maximum one-way delay of the packet flow during the block period, a minimum one-way delay of the packet flow during the block period, and a number or percentage of packets whose respective one-way delays are higher than a threshold one-way delay within the block period $T(k)$.

According to embodiments:
at step c), updating comprises, upon reception of each pair of consecutive packets of the packet flow during the block period, detecting a time lapsing between their receptions, calculating a time lapsing between their transmissions based on the packet transmission rate comprised in the measurement mode information, and calculating a respective one-way jitter based on the detected time lapsing between their receptions and the calculated time lapsing between their transmissions.
at step c), updating comprises, upon reception of each pair of consecutive packets of the packet flow during the block period, using the respective one-way jitter for updating at least one of: a maximum one-way jitter variable, a minimum one-way jitter variable, a maximum threshold jitter counter and a minimum threshold jitter counter; and
at step d), the calculating comprises using a value reached at the end of the block period by at least one of: the maximum one-way jitter variable, the minimum one-way jitter variable, the maximum threshold jitter counter and the minimum threshold jitter counter for calculating at least one of: a maximum one-way jitter of the packet flow during the block period, a minimum one-way jitter of the packet flow during the block period, a number or percentage of pairs of consecutive packets whose respective one-way jitters are higher than a maximum threshold one-way jitter within the block period and a number or percentage of pairs of consecutive packets whose respective one-way jitters are lower than a minimum threshold one-way jitter within the block period.

According to preferred variants, the method further comprises:

b') at the measurement start time, generating and transmitting a further packet flow from the second node to the first node, the further packet flow comprising a plurality of further packets whose transmission times are determined by the measurement start time and the packet transmission rate, generating and transmitting comprising generating and transmitting first further packets during the first block periods and second further packets during the second block periods;

c') at the block period, while the further packet flow is received at the first node, updating a further variable indicative of a behaviour of the further packet flow during the block period, by using the measurement mode information and detected information on reception of the further packet flow; and d') at the subsequent block period, calculating a further parameter indicative of a performance of the further packet flow during the block period using a value reached by the further variable at the end of the block period.

Preferably:

at step d), calculating comprises receiving from the first node the further parameter and calculating a two-way performance parameter indicative of a performance of the link using the parameter and the further parameter.

According to first variants, step b) is performed by the first node and steps c) and d) are performed by the second node.

According to second variants, step b) is performed by a first computer connected to the first node and steps c) and d) are performed by a second computer connected to the second node.

According to particularly preferred embodiments, the method further comprises performing an intermediate performance measurement of a portion of the link, the portion of the link having a first end provided with a first measurement point and a second opposite end provided with a second measurement point, the intermediate performance measurement comprising:

e) while the packet flow is transmitted from the first end of the portion of the link, at the first measurement point processing the packet flow for determining a transmission variable relating to transmission of the packet flow during the block period;

f) while the packet flow is received at the second end of the portion of the link, at the second measurement point processing the packet flow for determining a reception variable relating to reception of the packet flow during the block period;

g) at the subsequent block period, calculating a parameter indicative of a performance of the portion of the link during the block period using the transmission variable and the reception variable.

According to a second aspect, the present invention provides a node for a communication network, the node being configured to:

receive measurement mode information comprising at least a measurement start time and a packet transmission rate;

receive from a further node a packet flow comprising a plurality of packets whose transmission times are determined by the measurement start time and the packet transmission rate, the packet flow comprising first packets received during first block periods and second packets received during second block periods which alternate in time with the first block periods;

at a block period of the first block periods or second block periods, while the packet flow is received at the second node, update a variable indicative of a behaviour of the packet flow during the block period, by using the measurement mode information and detected information on reception of the packet flow; and at a subsequent block period of the first block periods or second block periods, calculate a parameter indicative of a performance of the packet flow during the block period using a value reached by the variable at the end of the block period.

According to a third aspect, the present invention provides a communication network comprising a node as set forth above.

According to a fourth aspect, the present invention provides a computer program product, loadable in the memory of at least one computer and including software code portions for performing the steps of the method as set forth above, when the product is run on at least one computer.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
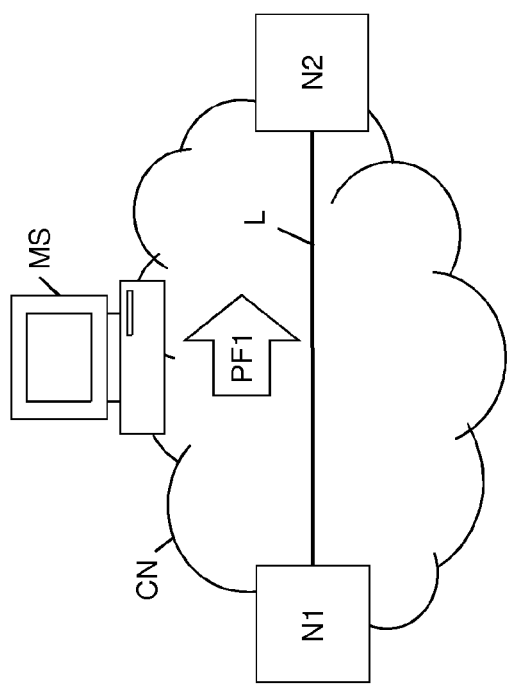
FIG. 1 schematically shows an exemplary packet-switched network.

FIG. 1 schematically shows an exemplary packet-switched communication network CN in which the method for performing a performance measurement according to embodiments of the present invention may be implemented. The communication network CN may be an IP network, an Ethernet network, an MPLS network or any other known type of packet-switched communication network.

The communication network CN comprises a plurality of nodes reciprocally interconnected by links according to any known topology.

In particular, the communication network CN comprises a first node N1 and a second node N2. Each one of the first node N1 and second node N2 preferably comprises a communication device such as a router, a switch etc. In addition, each one of the first node N1 and second node N2 is optionally connected to a respective computer (not shown in FIG. 1), as it will be discussed in detail herein after. The first node N1 and the second node N2 are connected by a link L. The link L may be a direct link or may pass through intermediate nodes of the network CN (not shown in the drawings). The link L is preferably a bidirectional link.

Preferably, the communication network CN is also suitable for cooperating with a management server MS. The management server MS may be either a stand-alone server connected to any of the nodes of the communication network CN. Alternatively, the management server MS may be implemented at any of the nodes of the communication network CN.

The first node N1 is preferably suitable for originating and transmitting to the second node N2 a packet flow PF1 of ad hoc packets Pk along the link L, namely of packets which are expressly originated for measurement purpose and that accordingly do not carry any user traffic. If the communication network CN is an IP network, the packets Pk are preferably formatted according to the known UDP protocol.

Figure 2:
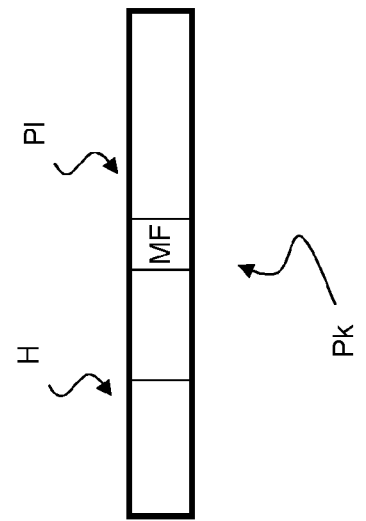
FIG. 2 schematically shows a packet's structure, according to an embodiment of the present invention.

As shown in FIG. 2, each packet Pk comprises a header H and a payload Pl. The header H preferably comprises information for routing the packet Pk, such as the source node address and the destination node address. The packet Pk further comprises a marking field MF, which may be set to one of two alternative marking values Va, Vb. The marking field MF may be comprised either in the header H or in the payload Pl of the packet Pk (this latter option being depicted in FIG. 2). For instance, the marking field MF may comprise a single bit and its two alternative marking values Va and Vb may be 1 and 0, respectively.

The packets Pk of the packet flow PF1 are preferably marked upon their generation and transmission by the first node N1, which properly sets the value of the marking field MF to one of the two alternative marking values Va, Vb. As it will be described in detail herein after, the first node N1 periodically changes the marking value Va, Vb assigned to the marking field MF (for instance, 1 or 0) with a period Tb, which will be termed herein after "block period". This way, packets Pk marked during first block periods (also termed herein after "even block periods") are marked by a first marking value Va (e.g. 1), while packets Pk marked during second block periods (also termed herein after "odd block periods") which alternate in time with the first block periods are marked by a second marking value Vb (e.g. 0).

According to embodiments of the present invention, before performing any performance measurement of the link L, both the nodes N1 and N2 are preferably provided with measurement mode information. Such measurement mode information preferably comprise one or more of the following data:
- a measurement start time $T_{start}$, indicating date and time at which the performance measurement of the link L shall start, namely the date and time at which the first node N1 shall start originating and transmitting the packet flow PF1 to the second node N2 along the link L;
- a measurement end time $T_{end}$, indicating date and time at which the performance measurement of the link L shall stop, namely the date and time at which the first node N1 shall stop originating and transmitting the packet flow PF1 to the second node N2 along the link L;
- a packet type, namely the type and length of the ad hoc packets Pk that shall compose the packet flow PF1 originated by the first node N1;
- a packet transmission rate, namely the transmission rate at which the first node N1 shall transmit the packets of the packet flow PF1. The packet transmission rate may be either constant or variable in time according to a predefined traffic profile;
- the block period Tb (which may be equal e.g. to 5 minutes); and
- a performance measurement type, which may comprise one or more of the following performance measurements: packet loss measurement, one-way delay measurements and one-way jitter measurements. In turn, the one-way delay measurements preferably comprise one or more of: average one-way delay, maximum and minimum one-way delay, threshold one-way delay percentage. Further, the one-way jitter measurements preferably comprise one or more of: average one-way jitter, maximum and minimum one-way jitter, maximum and minimum threshold one-way jitter percentage.

If the performance measurement type comprises the threshold one-way delay percentage, the measurement mode information preferably comprises also a threshold one-way delay OWDth.

Further, if the performance measurement type comprises the maximum and minimum threshold one-way jitter percentage, the measurement mode information preferably comprises also a maximum threshold one-way jitter OWJthmax (positive) and a minimum threshold one-way jitter OWJthmin (negative).

The measurement mode information may be originated by the network operator and transmitted directly to the first node N1 and the second node N2 through the management server MS. Alternatively, the first node N1 may receive the measurement mode information from the management server MS and forward them to the second node N2. The measurement mode information may be provided to the nodes N1, N2 only once, during a configuration phase preliminary to the first measurement session. Alternatively, the measurement mode information may be sent to the nodes N1, N2 before the start of each performance measurement session. According to other embodiments, a "static" portion of measurement mode information (including e.g. packet type, packet transmission rate and block period) is provided to the nodes N1, N2 during a preliminary configuration phase, whereas a "variable" portion of the measurement mode information (e.g. measurement start time, measurement end time and performance measurement type) is provided to nodes N1, N2 each time a new performance measurement session has to be started.

The operation of the first node N1 and the second node N2 during each performance measurement session will be now described in detail with reference to the flow chart of FIGS. 3, 4, 5a, 5b and 6, under the non limiting assumption that the performance measurement type specified in the measurement mode information comprises: packet loss measurement, one-way delay measurements (including average one-way delay, maximum and minimum one-way delay, threshold one-way delay percentage) and one-way jitter measurements (including average one-way jitter, maximum and minimum one-way jitter, maximum and minimum threshold one-way jitter percentage). This is non limiting, since only a sub-set of such measurements types may be requested within a measurement session.

Figure 3:
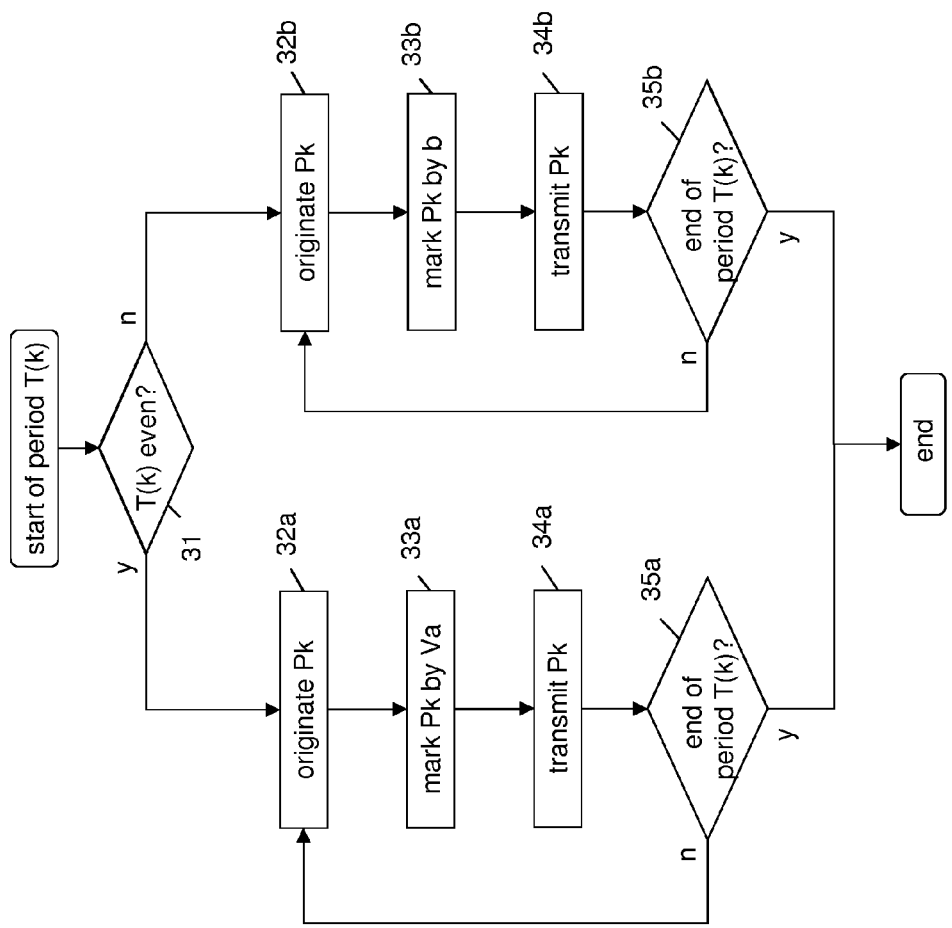
FIG. 3 is a flow chart of the method according to an embodiment of the present invention, at the transmitting side.

In particular, with reference to FIG. 3, at the beginning of each block period T(k) (k=0, 1, 2, 3, etc.), the first node N1 preferably checks whether the current block period T(k) is an even block period (k=0, 2, 4, etc.) or an odd block period (k=1, 3, 5, etc.) (step 31), and accordingly determines the marking value Va (during even block periods) or Vb (during odd block periods) to be applied to packets that will be originated and transmitted during the block period T(k).

Then, if the current block period T(k) is an even block period, the first node N1 preferably starts originating packets Pk (step 32*a*). The first node N1 preferably inserts in the header Hi of the packets Pk of the packet flow PF1 the destination address (namely, the address of the second node N2), the source address (namely, its own address) and, optionally, other fields of the packet header Hi (for instance, the field DSCP in case of IP packets).

Before transmitting each packet Pk, the first node N1 preferably marks it (step 33*a*) by the marking value Va, namely it sets its marking field MF equal to Va. The packet Pk is then transmitted (step 34*a*) to the second node N2 along the link L. The first node N1 preferably transmits the first packet Pk of the packet flow PF1 as the time $T_{loc}$ indicated by its local clock equals the measurement start time $T_{start}$ specified in the measurement mode information. Subsequent packets Pk are transmitted at transmission times which the first node N1 determines based on the packet transmission rate specified in the measurement mode information.

Steps 32*a*-34*a* are preferably iterated until the end of the block period T(k) (step 35*a*).

If, at step 31, it is determined that the block period T(k) is an odd block period, the first node N1 preferably starts originating packets Pk (step 32*b*). Before transmitting a packet Pk, the first node N1 preferably marks it (step 33*b*) by the marking value Vb, namely it sets its marking field MF equal to Va. The packet Pk is then transmitted to the second node N2 along the link L (step 34*b*). As mentioned above, the packets Pk are transmitted at transmission times which the first node N1 determines based on the packet transmission rate specified in the measurement mode information.

Steps 32*b*-34*b* are preferably iterated until the end of the block period T(k) (step 35*b*).

As the time $T_{loc}$ indicated by the local clock of the first node N1 equals the measurement end time $T_{end}$ specified in the measurement mode information, the first node N1 preferably stops executing the algorithm shown in FIG. 3.

Figure 4:
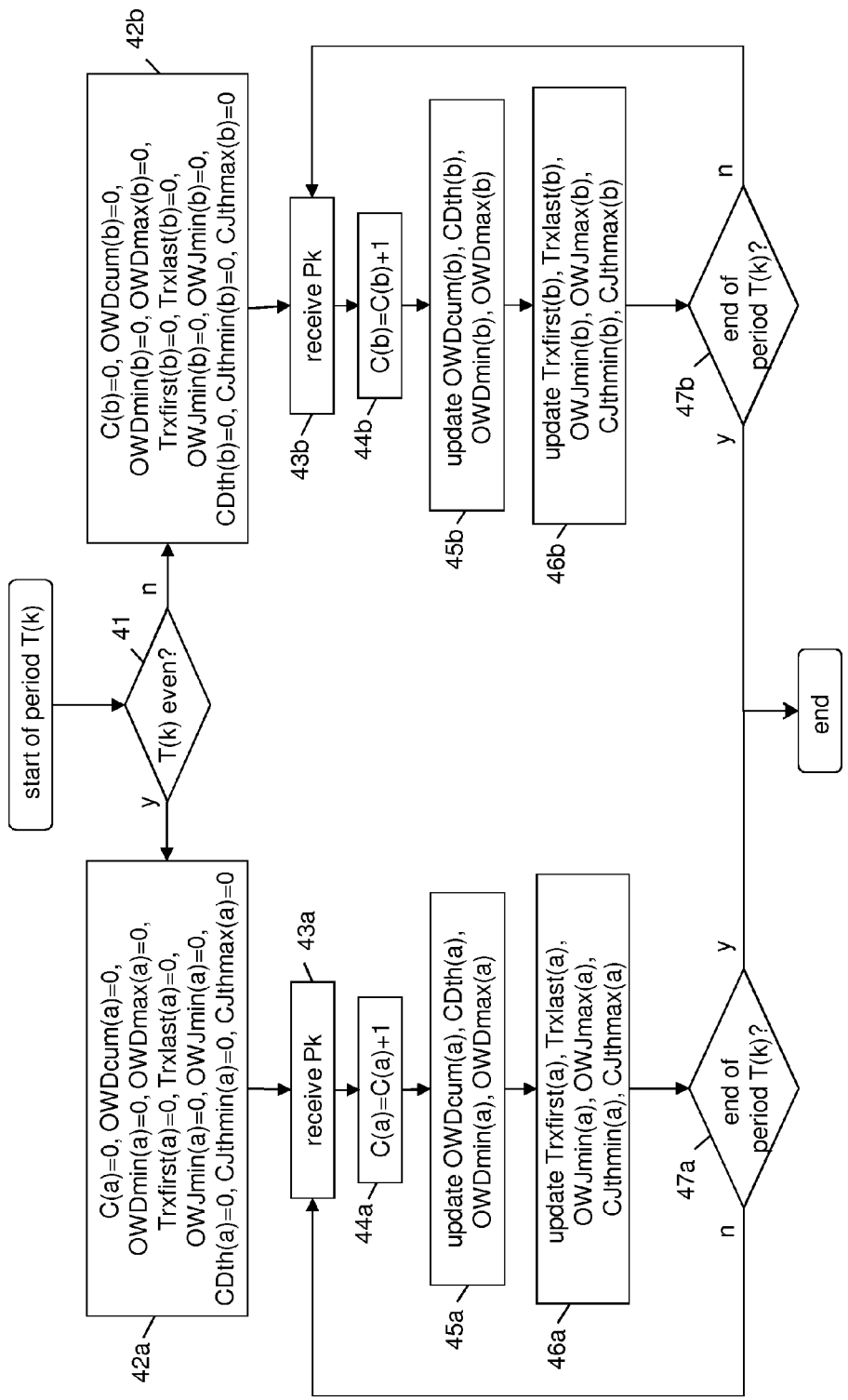
FIG. 4 is a first flow chart of the method according to an embodiment of the present invention, at the receiving side.

As to the second node N2, as the time $T_{loc}$ indicated by the local clock of the second node N2 equals the measurement start time $T_{start}$ specified in the measurement mode information, the second node N2 preferably starts executing the algorithm shown in FIG. 4. Herein after, it is assumed that the first node N1 and the second node N2 are reciprocally synchronized, namely their local clocks indicate the same date and time.

By referring to FIG. 4, at the beginning of each block period T(k), also the second node N2 preferably determines whether the current block period T(k) is an even block period or an odd block period (step 41).

Then, if the current block period T(k) is an even block period, a first reception counter C(a) is preferably initialized to zero (step 42*a*). Further, at step 42*a*, a first cumulative one-way delay OWDcum(a), a first minimum one-way delay OWDmin(a) and a first maximum one-way delay OWDmax(a) are preferably also initialized to zero. Further, at step 42*a*, a first first-packet reception timestamp Trxfirst(a), a first last-packet reception timestamp Trxlast(a), a first minimum one-way jitter OWJmin(a) and a first maximum one-way jitter OWJmax(a) are preferably also initialized to zero. Further, at step 42*a*, also a first threshold delay counter CDth(a), a first minimum threshold jitter counter CJthmin(a) and a first maximum threshold jitter counter CJthmax(a) are preferably initialized to zero.

Then, the second node N2 starts receiving packets Pk of the packet flow PF1 from the first node N1. The second node N2 preferably identifies the packets Pk of the packet flow PF1 by using at least part of their destination address, at least part of their source address and, optionally, other fields of the packet header Hi (for instance, the field DSCP in case of IP packets).

Upon reception of a packet Pk of the packet flow PF1 (step 43*a*), the first reception counter C(a) is preferably increased by 1 (step 44*a*).

Then, the first cumulative one-way delay OWDcum(a), the first threshold delay counter CDth(a), the first minimum one-way delay OWDmin(a) and the first maximum one-way delay OWDmax(a) are preferably updated, as it will be described in detail with reference to the flow chart of FIG. 5*a* (step 45*a*). Then, the first first-packet reception timestamp Trxfirst(a), the first last-packet reception timestamp Trxlast(a), the first minimum threshold jitter counter CJthmin(a), the first maximum threshold jitter counter CJthmax(a), the first minimum one-way jitter OWJmin(a) and the first maximum one-way jitter OWJmax(a) are preferably updated, as it will be described in detail with reference to the flow chart of FIG. 5*b* (step 46*a*).

Steps 43*a*-46*a* are preferably iterated each time a packet Pk of the packet flow PF1 is received, until the end of the block period T(k) (step 47*a*).

If, at step 41, it is determined that the block period T(k) is an odd block period, a second reception counter C(b) is preferably initialized to zero (step 42*b*). Further, at step 42*b*, a second cumulative one-way delay OWDcum(b), a second minimum one-way delay OWDmin(b) and a second maximum one-way delay OWDmax(b) are preferably also initialized to zero. Further, at step 42*b*, a second first-packet reception timestamp Trxfirst(b), a second last-packet reception timestamp Trxlast(b), a second minimum one-way jitter OWJmin(b) and a second maximum one-way jitter OWJmax(b) are preferably also initialized to zero. Further, at step 42*b*, also a second threshold delay counter CDth(b), a second minimum threshold jitter counter CJthmin(b) and a second maximum threshold jitter counter CJthmax(b) are preferably initialized to zero.

Upon reception of each packet Pk of the packet flow PF1 (step 43*b*), the second reception counter C(b) is preferably increased by 1 (step 44*b*).

Then, the second cumulative one-way delay OWDcum (b), the second threshold delay counter CDth(b), the second minimum one-way delay OWDmin(b) and the second maximum one-way delay OWDmax(b) are preferably updated, as it will be described in detail with reference to the flow chart of FIG. 5*a* (step 45*b*). Then, the second first-packet reception timestamp Trxfirst(b), the second last-packet reception timestamp Trxlast(b), the second minimum threshold jitter counter CJthmin(b), the second maximum threshold jitter counter CJthmax(b), the second minimum one-way jitter OWJmin(b) and the second maximum one-way jitter OWJmax(b) are preferably updated, as it will be described in detail with reference to the flow chart of FIG. 5*b* (step 46*b*).

Steps 43*b*-46*b* are preferably iterated each time a packet Pk of the packet flow PF1 is received, until the end of the block period T(k) (step 47*b*). The flow chart of FIG. 4 is iterated for each block period T(k), until the local time $T_{loc}$ as indicated by the local clock of the second node N2 equals the end measurement time $T_{end}$ specified in the measurement mode information.

Figure 5A:
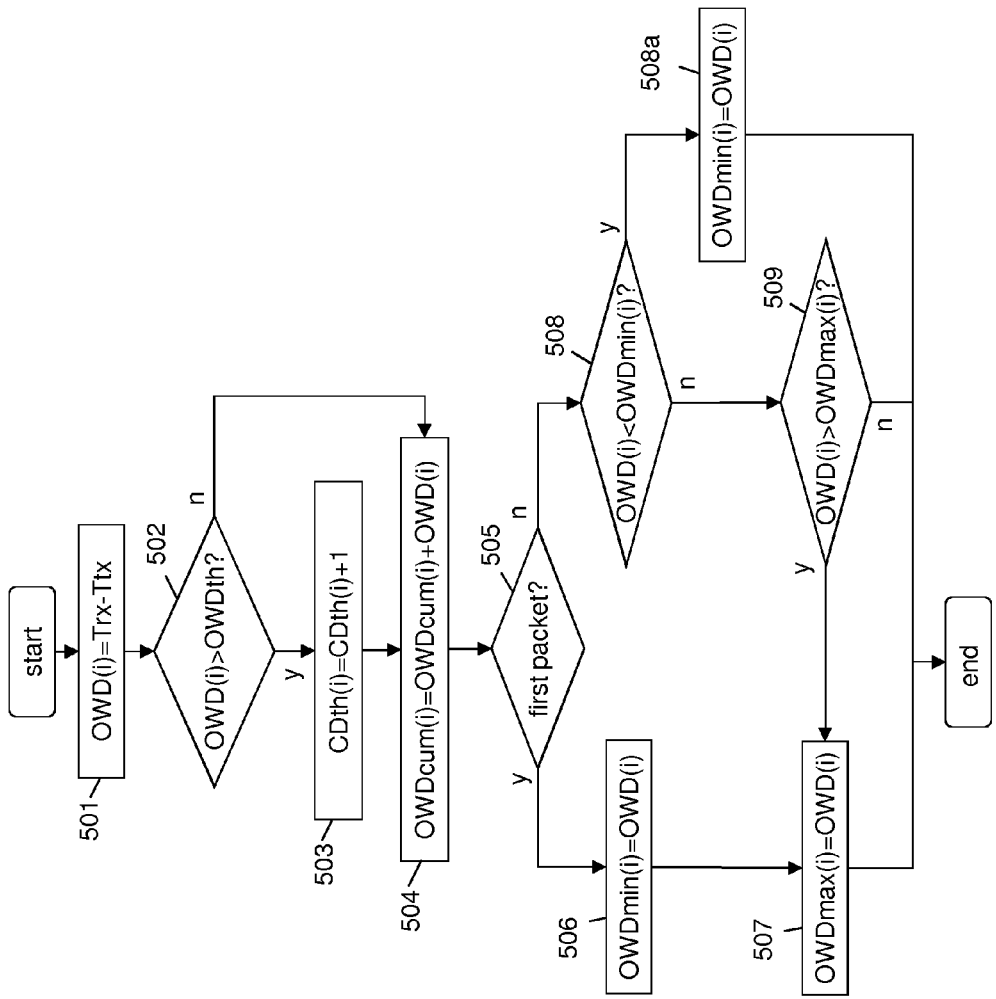
FIGS. 5a and 5b are flow charts illustrating in further detail two steps of the flow chart of FIG. 4.

FIG. 5a shows in further detail step 45a (and 45b). At step 45i ("i" being equal to either "a" if T(k) is an even block period or "b" if T(k) is an odd block period), a one-way delay OWD(i) is preferably calculated as a difference between the reception time Trx of the packet Pk as indicated by the local clock of the second node N2 and a transmission time Ttx of the same packet Pk by the first node N1 (step 501). It shall be noticed that the transmission time Ttx of the packet Pk is known a priori by the second node N2 (namely, without the need of explicitly receiving such information from the first node N1), because the second node N2 is capable of deriving it from the measurement mode information shared with the first node N1 before starting the performance measurement session. In particular, the second node N2 is advantageously capable of deriving the transmission time Ttx of each packet Pk from the measurement start time $T_{start}$, the block period Tb and the packet transmission rate specified in the measurement mode information. For instance, in case of constant packet transmission rate, the transmission time of each packet Pk is equal to the start time of the current block period T(k) (which is equal to $T_{start}$+k*Tb) increased by: the current value of the reception counter (namely C(a) for even block periods and C(b) for odd block periods) decreased by 1 and divided by the packet transmission rate. This advantageously allows the second node N2 to predict the time at which every single packet Pk of the packet flow PF1 will be transmitted by the first node N1 during the measurement session. Hence, the second node N2 may advantageously autonomously calculate the one-way delay undergone by each received packet Pk of the packet flow PF1 upon its reception, without the need of receiving any information from the first node N1 (except the measurement mode information received before the beginning of the measurement session).

Then, it is checked whether the one-way delay OWD(i) calculated at step 501 is higher than the threshold one-way delay OWDth specified in the measurement mode information (step 502). In the affirmative, the threshold delay counter CDth(i) initialized at step 42i ("i" being equal to either "a" if T(k) is an even block period or "b" if T(k) is an odd block period) is increased by one (step 503). In the negative, the value of the threshold delay counter CDth(i) is left unchanged. Steps 502-503 are omitted if no threshold delay measurement is required.

Then, the cumulative one-way delay OWDcum(i) initialized at step 42i ("i" being equal to either "a" if T(k) is an even block period or "b" if T(k) is an odd block period) is increased by the one-way delay OWD(i) calculated at step 501 (step 504).

Then, if the packet Pk is the first packet received during the current block period T(k) (step 505), the minimum one-way delay OWDmin(i) initialized at step 42i ("i" being equal to either "a" if T(k) is an even block period or "b" if T(k) is an odd block period) is preferably set equal to the one-way delay OWD(i) calculated at step 501 (step 506), and also the maximum one-way delay OWDmax(i) initialized at step 42i ("i" being equal to either "a" if T(k) is an even block period or "b" if T(k) is an odd block period) is preferably set equal to the one-way delay OWD(i) calculated at step 501 (step 507).

Otherwise, if the packet Pk is not the first packet received during the current block period T(k), it is preferably checked whether the one-way delay OWD(i) calculated at step 501 is lower than the current value of the minimum one-way delay OWDmin(i) (step 508). In the affirmative, the current value of the minimum one-way delay OWDmin(i) is preferably replaced by the one-way delay OWD(i) calculated at step 501 (step 508a). In the negative, the current value of the minimum one-way delay OWDmin(i) is not replaced and it is checked whether the one-way delay OWD(i) calculated at step 501 is higher than the current value of the maximum one-way delay OWDmax(i) (step 509). In the affirmative, the current value of the maximum one-way delay OWDmax(i) is preferably replaced by the one-way delay OWD(i) calculated at step 501 (step 507). In the negative, the current value of the maximum one-way delay OWDmax(i) is not replaced.

Hence, at the end each block period T(k), the threshold delay counter CDth(i) stores the number of packets Pk transmitted and received during the block period T(k) whose delay is above the threshold one-way delay OWDth, the cumulative one-way delay OWDcum(i) stores the sum of all the one-way delays undergone by the packets Pk transmitted and received during the block period T(k), the minimum one-way delay OWDmin(i) stores the one-way delay undergone by the "fastest" packet Pk transmitted and received during the block period T(k), while the maximum one-way delay OWDmax(i) stores the one-way delay undergone by the "slowest" packet Pk transmitted and received during the block period T(k), "i" being equal to either "a" if T(k) is an even block period (k=0, 2, 4, etc.) or "b" if T(k) is an odd block period (k=1, 3, 5, etc.).

Figure 5B:
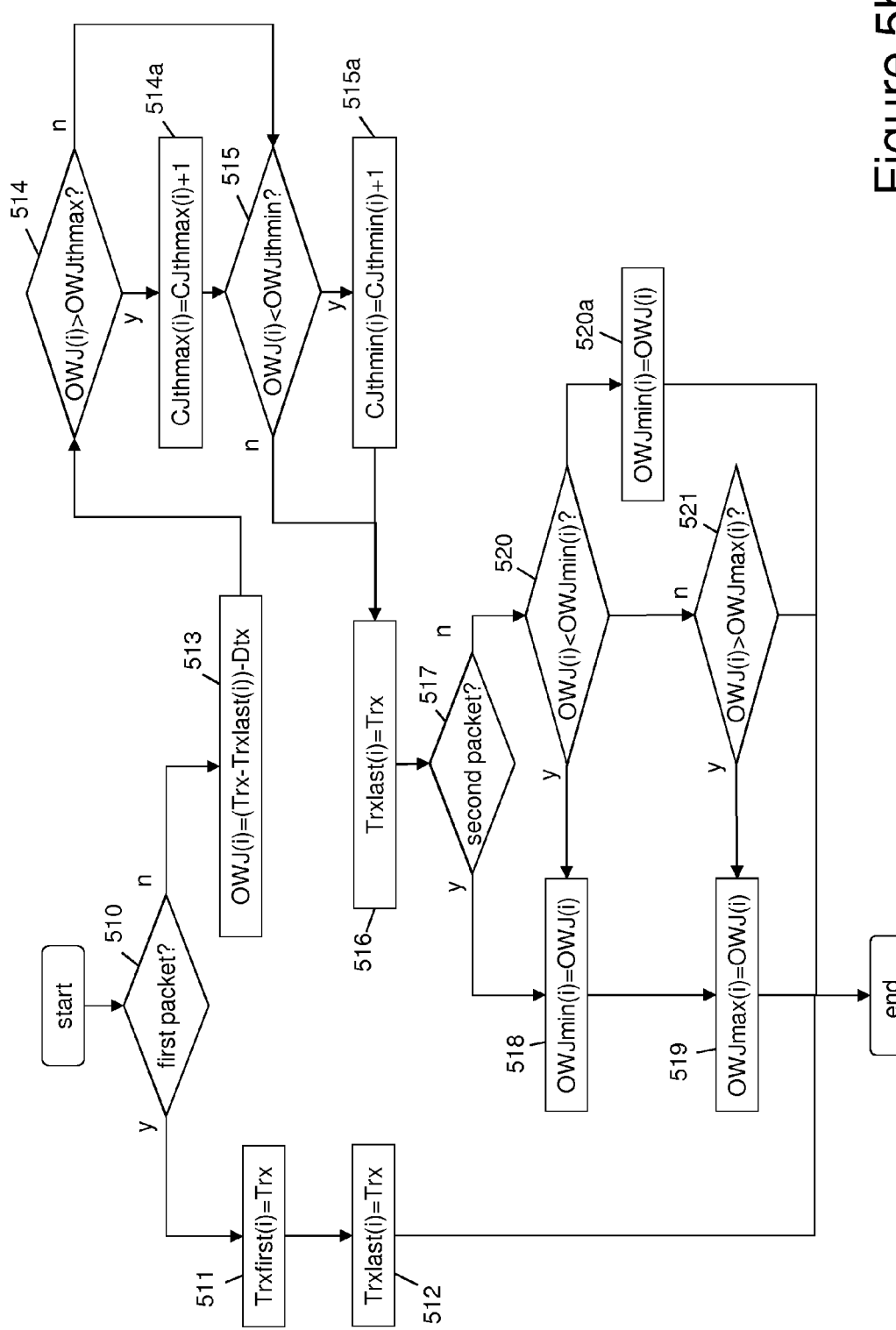

FIG. 5b shows in further detail step 46a (and 46b). At step 46i ("i" being equal to either "a" if T(k) is an even block period or "b" if T(k) is an odd block period), it is firstly checked whether the packet Pk is the first packet received during the block period T(k) (step 510).

If the packet Pk is the first packet received during the current block period T(k), the first-packet reception timestamp Trxfirst(i) initialized at step 42i ("x" being equal to either "a" if T(k) is an even block period or "b" if T(k) is an odd block period) is preferably set equal to the reception time Trx of the packet Pk as indicated by the local clock of the second node N2 (step 511). Furthermore, also the last-packet reception timestamp Trxlast(i) initialized at step 42i ("i" being equal to either "a" if T(k) is an even block period or "b" if T(k) is an odd block period) is preferably set equal to the same reception time Trx of the packet Pk as indicated by the local clock of the second node N2 (step 512).

Otherwise, if the packet Pk is not the first packet received during the current block period T(k), a one-way jitter OWJ(i) ("i" being equal to either "a" if T(k) is an even block period or "b" if T(k) is an odd block period) is preferably calculated as a difference between Trx-Trxlast(i) (namely, the time lapsing between reception of the packet Pk and reception of the previous packet) and Dtx, which is the time lapsing between transmission of the packet Pk and transmission of the previous packet (step 513). It shall be noticed that the time Dtx lapsing between transmission of the packet Pk and transmission of the previous packet is known a priori by the second node N2 (namely, without the need of receiving such information from the first node N1), because the second node N2 is capable of deriving it from the measurement mode information shared with the first node N1 before starting the performance measurement session. In particular, in case the packet transmission rate is constant, Dtx is equal to the reciprocal (namely, the multiplicative inverse) of the packet transmission rate and has the same value for all the pairs of consecutive packets Pk of the packet flow PF1. This advantageously allows the second node N2 to predict the time that will lapse between transmission of each pair of consecutive packets Pk of the packet flow PF1, without the need of receiving any explicit information from the first node N1 (except the measurement mode information received before the beginning of the measurement session).

Then, it is preferably checked whether the one-way jitter OWJ(i) calculated at step 513 is higher than the maximum threshold one-way jitter OWJthmax specified in the measurement mode information (step 514). In the affirmative, the maximum threshold jitter counter CJthmax(i) initialized at step 42i ("i" being equal to either "a" if T(k) is an even block period or "b" if T(k) is an odd block period) is increased by one (step 514a). Otherwise, the value of the maximum threshold jitter counter CJthmax(i) is left unchanged and it is checked whether the one-way jitter OWJ(i) calculated at step 513 is lower than the minimum threshold one-way jitter OWJthmin specified in the measurement mode information (step 515). In the affirmative, the minimum threshold jitter counter CJthmin(i) initialized at step 42i ("i" being equal to either "a" if T(k) is an even block period or "b" if T(k) is an odd block period) is increased by one (step 515a). Otherwise, the value of the minimum threshold jitter counter CJthmin(i) is left unchanged. Steps 514-515a are preferably omitted if no threshold jitter percentage measurements are requested.

Then, the value of the last-packet reception timestamp Trxlast(i) is updated with the reception time of the currently received packet Pk, namely it is set equal to the reception time Trx of the packet Pk as indicated by the local clock of the second node N2 (step 516).

Then, it is checked whether the currently received packet Pk is the second packet received during the current block period T(k), namely the first packet for which the one-way jitter OWJ(i) has been calculated (step 517). In the affirmative, the minimum one-way jitter OWJmin(i) initialized at step 42i ("i" being equal to either "a" if T(k) is an even block period or "b" if T(k) is an odd block period) is preferably set equal to the one-way jitter OWJ(i) calculated at step 513 (step 518) and also the maximum one-way jitter OWJmax(i) initialized at step 42i ("i" being equal to either "a" if T(k) is an even block period or "b" if T(k) is an odd block period) is preferably set equal to the one-way jitter OWJ(i) calculated at step 513 (step 519).

Otherwise, if the packet Pk is not the second packet received during the current block period T(k), it is preferably checked whether the one-way jitter OWD(i) calculated at step 513 is lower than the current value of the minimum one-way jitter OWJmin(i) (step 520). In the affirmative, the current value of the minimum one-way jitter OWJmin(i) is preferably replaced by the one-way jitter OWJ(i) calculated at step 513 (step 520a). In the negative, the current value of the minimum one-way jitter OWJmin(i) is not replaced and it is checked whether the one-way jitter OWJ(i) calculated at step 513 is higher than the current value of the maximum one-way jitter OWJmax(i) (step 521). In the affirmative, the current value of the maximum one-way jitter OWJmax(i) is preferably replaced by the one-way jitter OWJ(i) calculated at step 513 (step 519). In the negative, the current value of the maximum one-way jitter OWJmax(i) is not replaced.

Hence, at the end each block period T(k), the maximum threshold one-way jitter counter CJthmax(i) stores the number of pairs of consecutive packets Pk transmitted and received during the block period T(k) whose one-way jitter is above the maximum threshold one-way jitter OWJthmax (positive), the minimum threshold one-way jitter counter CJthmin(i) stores the number of pairs of consecutive packets Pk transmitted and received during the block period T(k) whose one-way jitter is below the minimum threshold one-way jitter OWJthmin (negative), the first-packet reception timestamp Trxfirst(i) stores the reception time of the first packet Pk transmitted and received during the current block period T(k), the last-packet reception timestamp Trxlast(i) stores the reception time of the last packet Pk transmitted and received during the current block period T(k), the minimum one-way jitter OWJmin(i) stores the minimum one-way jitter undergone by the pairs of consecutive packets Pk transmitted and received during the block period T(k), while the maximum one-way jitter OWJmax(i) stores the maximum one-way jitter undergone by the pairs of consecutive packets Pk transmitted and received during the block period T(k), "i" being equal to either "a" if T(k) is an even block period (k=0, 2, 4, etc.) or "b" if T(k) is an odd block period (k=1, 3, 5, etc.).

Figure 6:
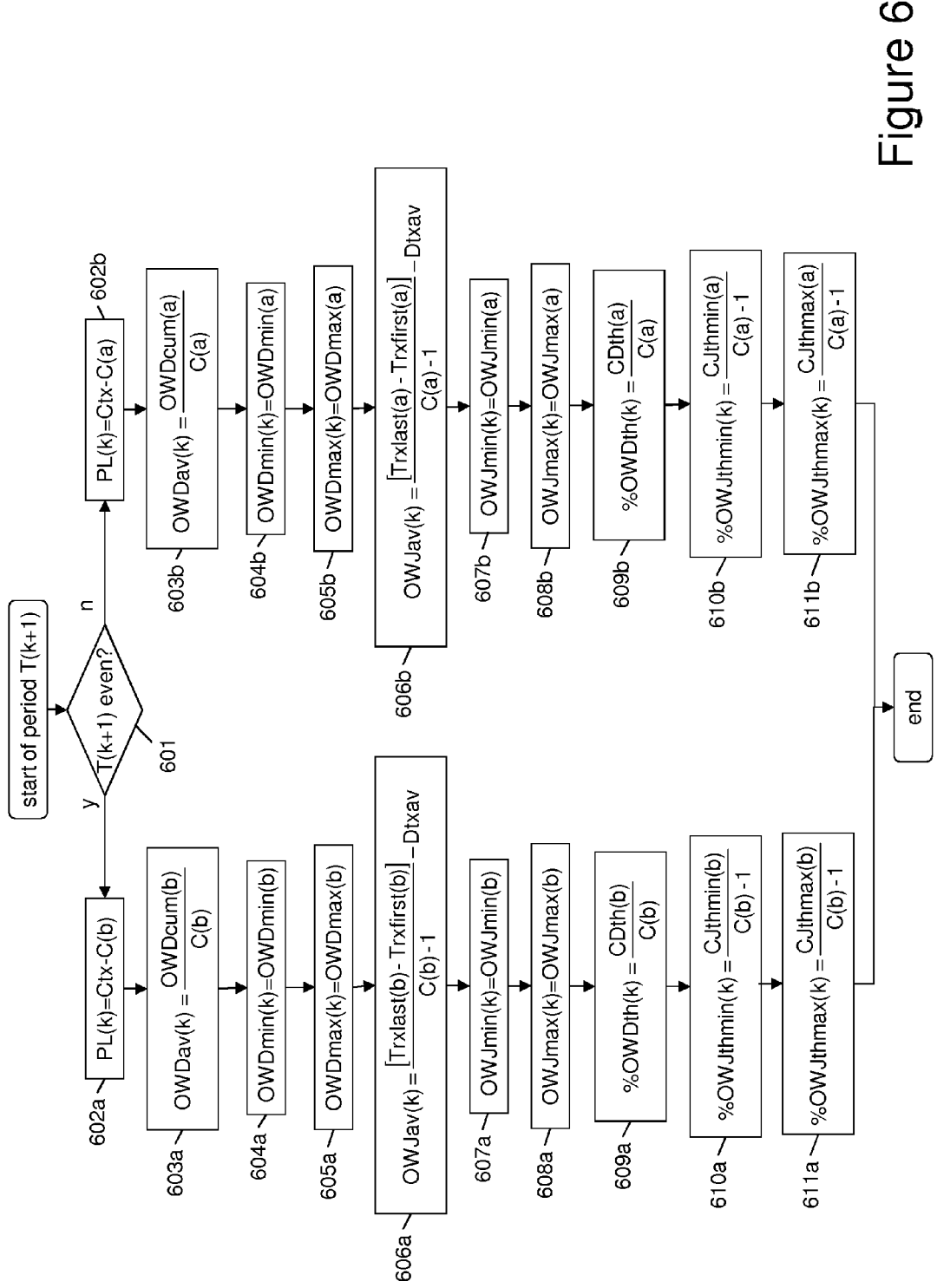
FIG. 6 is a second flow chart of the method according to an embodiment of the present invention, at the receiving side.

Referring now to FIG. 6, during the successive block period T(k+1), it is determined whether the block period T(k+1) is an even or odd block period (step 601).

If the block period T(k+1) is an even block period, it is determined that the values of the variables relating to packets marked by Va may be currently changing, whereas the values of the variables relating to packets marked by Vb are currently constant and may accordingly be used for providing performance measurements relating to the block period T(k).

Hence, a packet loss PL(k) is preferably calculated as a difference between a number of packets Ctx transmitted by the first node N1 during the block period T(k) and the value of the second reception counter C(b) at the end of the block period T(k). It shall be noticed that the number of packets Ctx transmitted by the first node N1 during the block period T(k) is known a priori by the second node N2 (namely, without the need of receiving such information from the first node N1), because the second node N2 is capable of deriving it from the measurement mode information shared with the first node N1 before starting the performance measurement session. In particular, the second node N2 is advantageously capable of deriving the number of transmitted packets Ctx based on the block period Tb and the packet transmission rate specified in the measurement mode information. For instance, in case the packet transmission rate is constant, the number of packets Ctx is equal to Tb divided by the packet transmission rate and has the same value for all the block periods T(k). This advantageously allows the second node N2 to predict the number of packet Pk of the packet flow PF1 that will be transmitted by the first node N1 during each block period T(k). Hence, the second node N2 may advantageously autonomously calculate the packet loss PL(k) of the packet flow PF1 in each block period T(k) without the need of receiving any information from the first node N1 (except the measurement mode information received before the beginning of the measurement session).

Further, an average one-way delay OWDav(k) is preferably calculated as the value of the second cumulative one-way delay OWDcum(b) at the end of the block period T(k) divided by the value of the second reception counter C(b) at the end of the block period T(k) (step 603a).

Further, a minimum one-way delay OWDmin(k) is preferably set equal to the value of the second minimum one-way delay OWDmin(b) at the end of the block period T(k) (step 604a), whereas a maximum one-way delay OWDmax(k) is preferably set equal to the value of the second maximum one-way delay OWDmax(b) at the end of the block period T(k) (step 605a).

Further, an average one-way jitter OWJav(k) is preferably calculated according to the following equation:

$$OWJav(k) = \frac{[Trxlast(b) - Trxfirst(b)]}{C(b) - 1} - Dtxav, \quad [3]$$

where Dtxav is the average time lapsing between transmission of two consecutive packets Pk of the packet flow PF1 by the first node N1 during the block period T(k) (step 606a). It shall be noticed that the time Dtxav is known a priori by the second node N2 (namely, without the need of receiving such information from the first node N1), because the second node N2 is capable of deriving it from the measurement mode information shared with the first node N1 before starting the performance measurement session. In particular, if the packet transmission rate as specified in the measurement mode information is constant, the average time Dtxav is equal to the time Dtx (see step 513 of FIG. 5b), namely is equal to the reciprocal (namely, the multiplicative inverse) of the packet transmission rate. Hence, the second node N2 is also advantageously capable of autonomously calculating the average one-way jitter affecting the pairs of consecutive packets Pk received during the block period T(k), without the need of receiving any information from the first node N1 (except the measurement mode information received before the beginning of the measurement session).

Further, a minimum one-way jitter OWJmin(k) is preferably set equal to the value of the second minimum one-way jitter OWJmin(b) reached at the end of the block period T(k) (step 607a), whereas a maximum one-way jitter OWJmax(k) is set equal to the value of the second maximum one-way jitter OWJmax(b) reached at the end of the block period T(k) (step 608a).

Further, a percentage % OWDth(k) of packets Pk transmitted and received during the block period T(k), whose one-way delay is above the threshold one-way delay OWDth specified in the measurement mode information, is preferably calculated as the value of the second threshold delay counter CDth(b) reached at the end of the block period T(k) divided by the value of the second reception counter C(b) reached at the end of the block period T(k) (step 609a).

Further, a percentage % OWJthmin(k) of pairs of packets Pk transmitted and received during the block period T(k), whose one-way jitter is below the minimum threshold one-way jitter OWJthmin (negative) specified in the measurement mode information, is preferably calculated as the value of the second minimum threshold jitter counter CJthmin(b) reached at the end of the block period T(k) divided by C(b)−1 (step 610a). Further, a percentage % OWJthmax(k) of pairs of packets Pk transmitted and received during the block period T(k), whose one-way jitter is above the maximum threshold one-way jitter OWJthmax (positive) specified in the measurement mode information, is preferably calculated as the value of the second maximum threshold jitter counter CJthmax(b) reached at the end of the block period T(k) divided by C(b)−1 (step 611a).

If at step 601 it is determined that the block period T(k+1) is an odd block period, it is determined that the values of the variables relating to packets marked by Va are currently constant and may accordingly be used for providing performance measurements relating to the block period T(k), whereas the values of the variables relating to packets marked by Vb may be currently changing.

Hence, the packet loss PL(k), one-way delays OWDav(k), OWDmin(k), OWDmax(k), one-way jitters OWJav(k), OWJmin(k), OWJmax(k) and threshold percentages % OWDth(k), % OWJthmax(k), % OWJthmin(k) relating to the block period T(k) are preferably calculated using the variables relating to packets marked by Va (steps 602b-611b). Steps 602b-611b are substantially similar to the above described steps 602a-611a, except that they are applied to variables relating to packets marked by Va rather than to variables relating to packets marked by Vb. Hence, a detailed description will not be repeated.

Preferably, the time at which the algorithm of FIG. 6 is performed is delayed by a safety wait time SWT relative to the start time of the block period T(k+1). Indeed, due to the propagation delay of the packets Pk along the link L or to a reception sequence error, the last packets marked by Va transmitted by the first node N1 during an even block period T(k) may be received by the second node N2 at the beginning of the subsequent odd block period T(k+1). Hence, at the beginning of an odd block period T(k+1), the variables relating to packets marked by Va may still be varying. Similarly, the last packets marked by Vb transmitted by the first node N1 during an odd block period T(k) may be received by the second node N2 at the beginning of the subsequent even block period T(k+1). Hence, at the beginning of an even block period T(k+1), the variables relating to packets marked by Vb may still be varying. The safety wait time SWT guarantees that the variables relating to packets marked by Va or Vb are used for calculating packet loss, one-way delays, one-way jitters and percentages only when their values are stabilized during the block period T(k+1). The safety wait time SWT is preferably comprised between 1 and 50% of the block period Tb. For instance, if the block period Tb is equal to 5 minutes, the safety wait time SWT may be equal to 20% Tb, namely 1 minute.

The safety wait time SWT also makes the maximum/minimum delay and jitter measurements and threshold delay and jitter percentage measurements carried out as described above immune from possible reception sequence errors occurring at the edge between consecutive block periods (the average delay and jitter and packet loss measurements carried out as described above being instead intrinsically immune from any sequence error). In this respect, according to particularly preferred variants, the packet transmission rate of the packet flow PF1 is selected in order to prevent any reception sequence error. In particular, the packet transmission rate is preferably selected so that the above mentioned time Dtx lapsing between transmission of consecutive packets Pk (see above step 513 of FIG. 5b) is longer than a predefined one-way delay. The value of Dtx depends on the transmission features of the link L. For instance, Dtx may be chosen higher than the average one-way delay OWDav(k) (measured without considering reception sequence errors) or the maximum one-way delay OWDmax(k) (measured using a very low packet transmission rate, namely a packet transmission rate which guarantees that no reception sequence error may occur).

Then, optionally, the packet loss PL(k), one-way delays OWDav(k), OWDmin(k), OWDmax(k), one-way jitters OWJav(k), OWJmin(k), OWJmax(k) and threshold percentages % OWDth(k), % OWJthmax(k), % OWJthmin(k) relating to the block period T(k) may be transmitted to the management server MS (step not shown in the drawings), which stores them so that they may be accessed by the network operator. This step may be performed e.g. by establishing a communication session between the second node N2 and the management server MS based on a known communication protocol, for instance FTP (File Transfer Protocol). The communication session may be started either by the second node N2 or the management server MS.

The steps shown in the flow chart of FIG. 6 are preferably iterated at each block period, each iteration providing performance measurements relating to the previous block period.

The above described method has a number of advantages.

First of all, the performance measurements (in particular, the delay and jitter measurements) are very accurate, since the transmission times calculated by the second node N2 as described above indicate in a very precise way the times at which the packets Pki of the packet flow PF1 are actually transmitted by the first node N1. Hence, possible inaccuracies due to the mismatch between expected transmission times and actual transmission times (due e.g. to unpredictable offsets introduced by packet processing before transmission) are advantageously avoided.

Optionally, a check may be provided on the matching between expected transmission times Ttx as calculated by the second node N2 starting from the measurement mode information and actual transmission times of the packets Pk. This check is preferably carried out e.g. in case the first node N1 is not capable of guaranteeing that transmission of the packet flow PF1 is fully compliant with the measurement mode information. For carrying out this check, a check average one-way delay is preferably calculated using, instead of the transmission times Ttx determined by the second node N2 based on the measurement mode information (see step 501 of FIG. 5a), the actual transmission times as indicated by the local clock of the first node N1. Such calculation is preferably carried out as follows:

- at the first node N1, an average transmission time is calculated as the sum of the transmission times of all the packets Pk transmitted during a block period T(k), divided by the number of packets transmitted during the block period T(k);
- at the second node N2, an average reception time is calculated as the sum of the reception times of all the packets Pk received during the block period T(k), divided by the number of packets received during the block period T(k);
- the average transmission time is transmitted by the first node N1 to the second node N2; and
- at the second node N2, the check average one-way delay is calculated as the difference between the average reception time and the average transmission time.

Then, an error is calculated as the difference between the check average one-way delay and the average one-way delay OWDav(k) calculated at step 603a/603b of the flow chart of FIG. 6. If such error is lower than a given threshold, the minimum and maximum delay and jitter measurements carried out by the second node N2 as described above, as well as the threshold delay and jitter percentage measurements, are deemed accurate. Otherwise, such measurement are discarded as unreliable.

A further advantage of the method as described above is that the performance measurement of the link L is performed at the reception side (namely, by the second node N2 or a computer connected to the second node N2) without receiving from the first node N1 any information during the measurement session. The measurement mode information provided to the second node N2 before the measurement is started indeed comprise information on the packet flow PF1 that allow the second node N2 to autonomously derive all the transmission counters and transmission times needed for the calculation of packet loss, one-way delay (average, minimum and maximum), one-way jitter (average, minimum and maximum) and threshold percentages. No extra bandwidth is therefore required for transmitting transmission counters and transmission times from the first node N1 to the second node N2 (or transmission of counters and times from both the nodes N1 and N2 to a central entity such as the network manager NM which performs the calculations).

Furthermore, the measurement of maximum/minimum delay and jitter requires a very reduced computational effort at the reception side. Indeed, since the transmission times of all the packets Pk are known a priori, at the reception side the one-way delay OWD(i) and one-way jitter OWJ(i) are calculated (see step 501 in FIG. 5a and step 513 in FIG. 5b) and used for updating the values of the variables storing the minimum and maximum delay and jitter relating to the block period T(k) (see steps 506-509 in FIG. 5a and steps 518-521 in FIG. 5b) upon reception of each packet Pk. Hence, advantageously, there is no need to store all the reception times of all the packets Pk received during a block period T(k), which would be instead required if calculation of one-way delay OWD(i) and one-way jitter OWJ(i) were performed a posteriori using transmission times received from the first node N1.

Besides, since the method of the invention is carried out on artificial traffic, it exhibits the same advantages as those of known techniques applied to artificial traffic over techniques applied to real traffic, which advantages mainly derive from the fact the operator may control the features of the traffic to be measured.

First of all, the packet transmission rate of the packet flow PF1 may be advantageously adapted to the computational resources available at the reception side, where the performance measurements are performed (either by the second node N2 or a PC connected to the second node N2, as it will be discussed in detail herein after). For instance, a packet transmission rate corresponding to 300-400 Mbps (which is typically much lower than transmission rates of real traffic, which may range from 1 Gbps to 10 Gbps) allows performing all the performance measurements as described above by a commercial computer connected to the second node N2, as it will be described in detail herein after.

Moreover, the packet transmission rate of the packet flow PF1 may be adjusted so as to prevent any reception sequence error. Furthermore, the packets Pk of the packet flow PF1 may be instead customized/adapted in a very flexible way so as to include the marking field MF, which may be included either into the header or payload of the packets Pk. Besides, real packets carrying user traffic between the nodes N1 and N2 are advantageously left unchanged.

In the above described embodiment, it has been assumed that only the performance of the link L in the direction from the first node N1 to the second node N2 is measured. According to other embodiments, also the performance of the link L in the reverse direction (namely, from the second node N2 to the first node N1) is measured. By referring to FIG. 7, to this purpose the second node N2 preferably originates and transmits to the first node N1 a further packet flow PF2 of ad hoc packets Pk. The further packet flow PF2 originated and transmitted by the second node N2 is preferably compliant with the measurement mode information exchanged by the first node N1 and the second node N2 before starting the measurement session. In particular, transmission of the further packet flow PF2 starts at the measurement start time $T_{start}$ specified in the measurement mode information, the packets Pk of the further packet flow PF2 are of the type specified in the measurement mode information and are transmitted at the packet transmission rate specified in the measurement mode information. Moreover, the packets Pk of the further packet flow PF2 are marked with marking values Va, Vb which alternate in time with the block period Tb specified in the measurement mode information. Therefore, the packet flow PF1 and the further packet flow PF2 are substantially identical. In particular, each time the first node N1 transmits a packet Pk of the packet flow PF1, at the same time the second node N2 transmits a packet Pk of the further packet flow PF2 (provided the two nodes are synchronized).

Preferably, according to such embodiments, the behaviour of the second node N2 at its transmission side is the same as the behaviour of the first node N1 as described above with reference to the flow chart of FIG. 3. Further, preferably, the behaviour of the second node N2 at its reception side is the same as described above with reference to the flow charts of FIGS. 4, 5a, 5b and 6. As a result of execution of such steps (whose detailed description will not be repeated herein after), the second node N2 preferably calculates, for each block period T(k), a packet loss PL1(k), an average one-way delay OWDav1(k), a minimum one-way delay OWDmin1(k), a maximum one-way delay OWDmax1(k), an average one-way jitter OWJav1(k), a minimum one-way jitter OWJmin1(k), a maximum one-way jitter OWJmax1(k), a threshold delay percentage % OWDth1(k), a minimum threshold jitter percentage % OWJthmin1(k) and a maximum threshold jitter percentage % OWJthmax1(k) relating to the further packet flow PF1.

As to the first node N1, its behaviour at the transmission side is the same as described above with reference to the flow chart of FIG. 3. Further, preferably, the behaviour of the first node N1 at its reception side is the same as described above with reference to the flow charts of FIGS. 4, 5a, 5b and 6, except that the steps shown in such flow charts are applied to packets Pk of the further packet flow PF2 which the first node N1 receives from the second node N2. As a result of the execution of such steps (whose detailed description will not be repeated herein after), the first node N1 preferably calculates, for each block period T(k), a packet loss PL2(k), an average one-way delay OWDav2(k), a minimum one-way delay OWDmin2(k), a maximum one-way delay OWDmax2(k), an average one-way jitter OWJav2(k), a minimum one-way jitter OWJmin2(k), a maximum one-way jitter OWJmax2(k), a threshold delay percentage % OWDth2(k), a minimum threshold jitter percentage % OWJthmin2(k) and a maximum threshold jitter percentage % OWJthmax2(k) relating to the further packet flow PF2.

Hence, each node N1, N2 receiving a respective packet flow PF2, PF1 from the opposite node N2, N1 is capable of autonomously provide performance measurements relative to the link L in the incoming direction, exclusively based on a local processing of the received packets and using information derivable from the measurement mode information. No further exchange of information (such as counters and timestamps) is needed—except the measurement mode information—between the nodes N1, N2, nor it is required that the nodes N1, N2 provide their own counters and timestamps to a central entity.

In the above description, it has been assumed that the first node N1 and the second node N2 are reciprocally synchronized, namely that their local clocks always indicate the same date and time. More generally, however, a mismatch may exist between the local clocks of the nodes of a communication network. Such mismatch introduces an error on the one-way delay measurements (average one-way delay OWDav(k), maximum one-way delay OWDmax(k), minimum one-way delay OWDmin(k) and threshold delay percentage % OWDth(k)) carried out according to steps 603a/b, 604a/b, 605a/b and 609a/b of the flow chart of FIG. 6. Such measurements indeed are all based upon the value of the one-way delay of each received packet Pk calculated at step 501 of the flow chart shown in FIG. 5a. As explained above, such value is calculated as the difference between the reception time Trx of the packet Pk as indicated by the local clock of the second node N2 and an expected transmission time Ttx, which the second node N2 derives from the measurement mode information. In case the first node N1 and the second node N2 are not synchronized, such difference is affected by an error which increases as the mismatch between the local clocks of the two nodes increases.

According to a particularly preferred embodiment of the present invention, in case the first node N1 and the second node N2 are misaligned, at least one of the first node N1 and the second node N2 (e.g. the second node N2) performs a two-way delay measurement, as it will be described in detail herein after.

For allowing the second node N2 to perform a two-way delay measurement, the measurement mode information provided to the second node N2 before starting the measurement session preferably comprises, instead of the threshold one-way delay OWDth mentioned above, a threshold two-way delay TWDth and a threshold two-way delay percentage % TWDth indicating the maximum percentage of packets Pk whose two-way delay may exceed the threshold two-way delay TWDth (e.g. 5%). The values of the threshold two-way delay TWDth and the threshold two-way delay percentage % TWDth are defined within the SLA (Service Level Agreement) stipulated between network operator and customer. Further, according to such embodiments, the packet transmission rate as specified in the measurement mode information is preferably constant, so that both the packet flow PF1 and the further packet flow PF2 comprise a given number of packets Nb for each block period T(k), which is equal to the block period Tb divided by the packet transmission rate.

Figure 7:
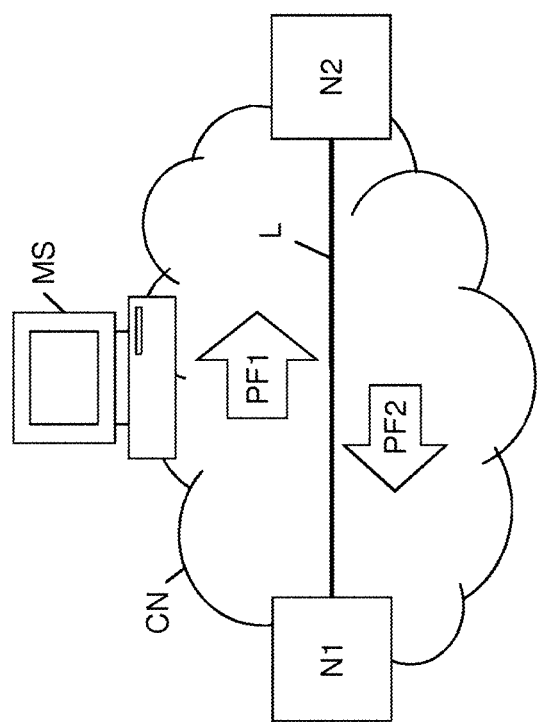
FIG. 7 schematically shows the exemplary packet-switched network of FIG. 1, in a second scenario.

According to such particularly preferred embodiment, the first node N1 transmits the packet flow PF1 to the second node N2 and, at the same time, the second node N2 transmits the further packet flow PF2 to the first node N1, as shown in FIG. 7. The operation of the nodes N1, N2 at their transmitting sides is similar to that shown in FIG. 3 and accordingly will not be repeated.

Figure 8:
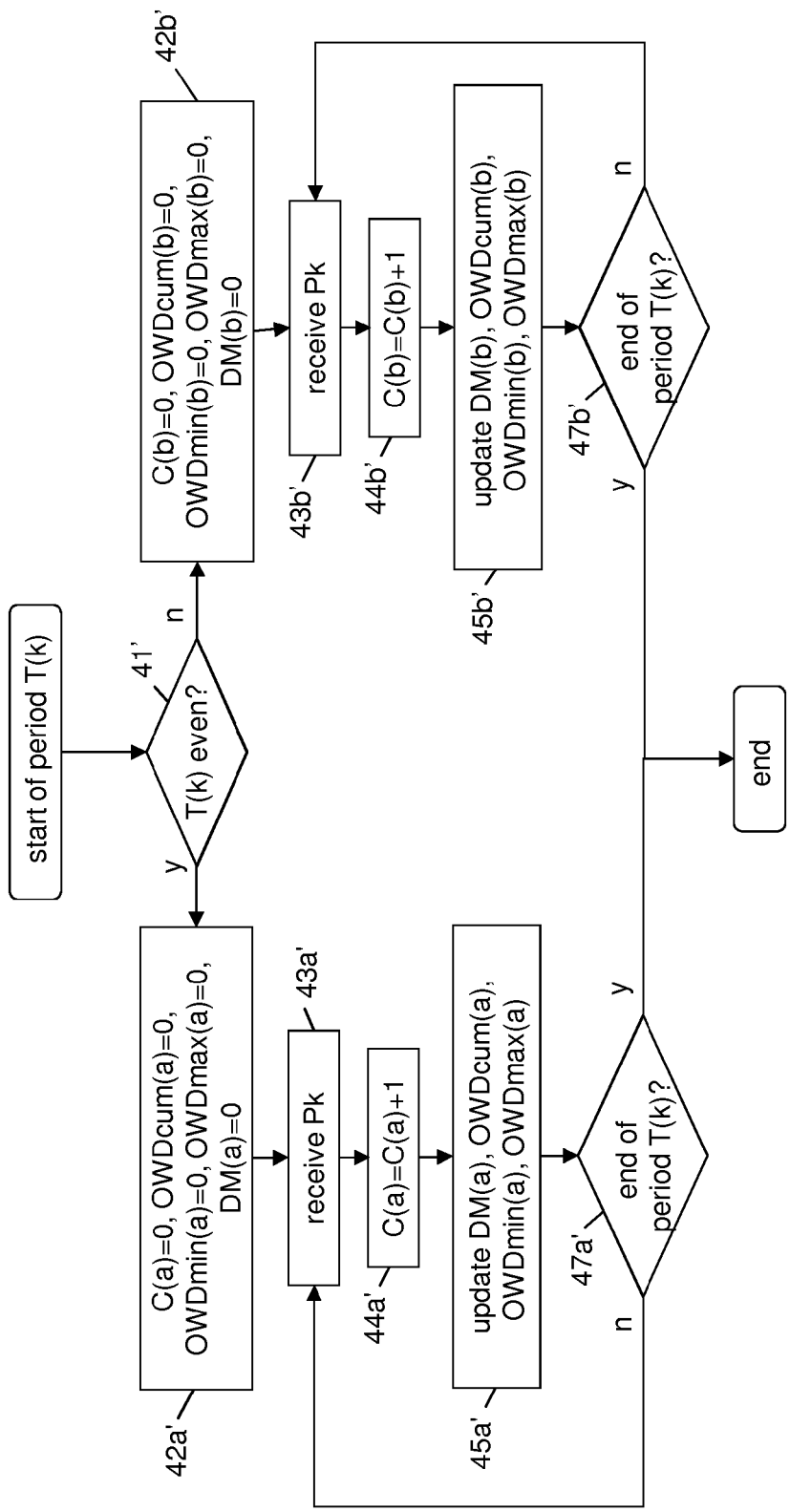
FIG. 8 is a first flow chart of the method according to a further embodiment of the present invention, at the receiving side.
Figure 9:
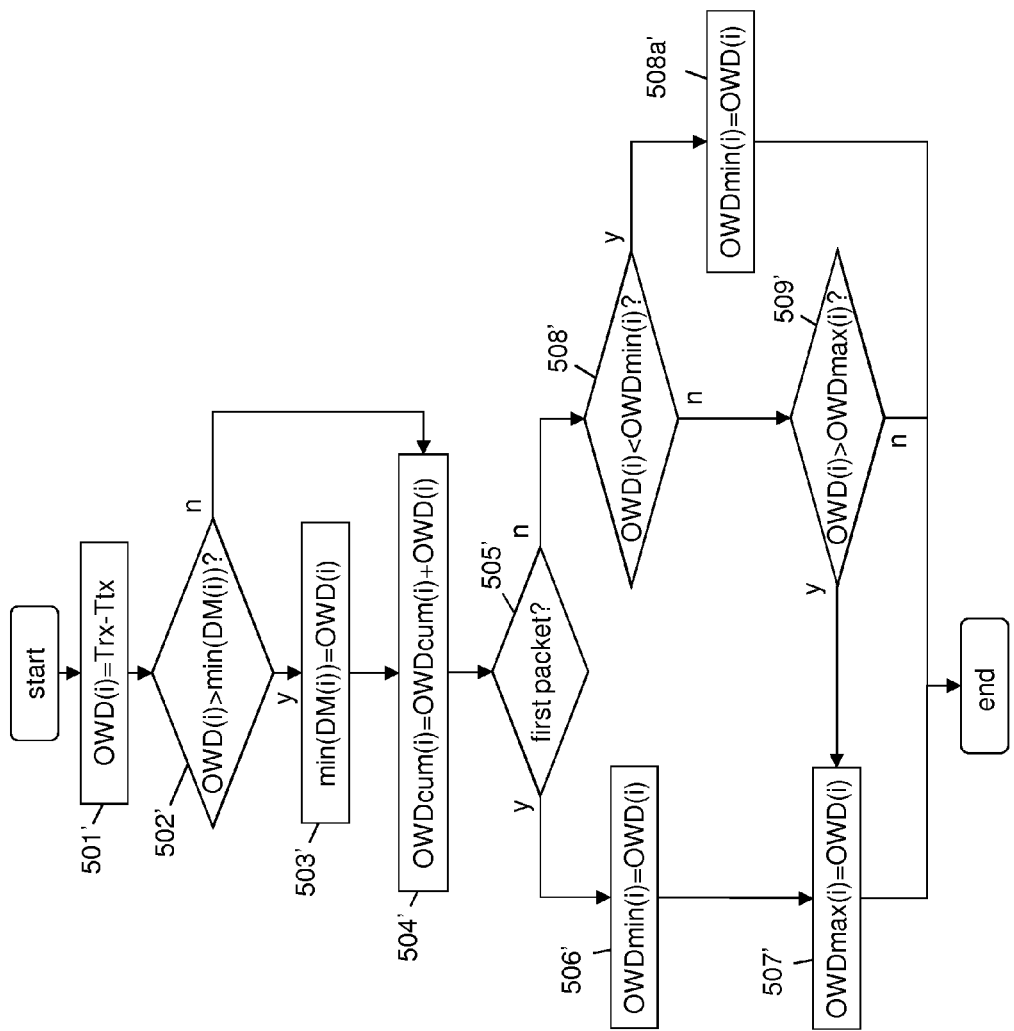
FIG. 9 is a flow chart illustrating in further detail a step of the flow chart of FIG. 8.
Figure 10:
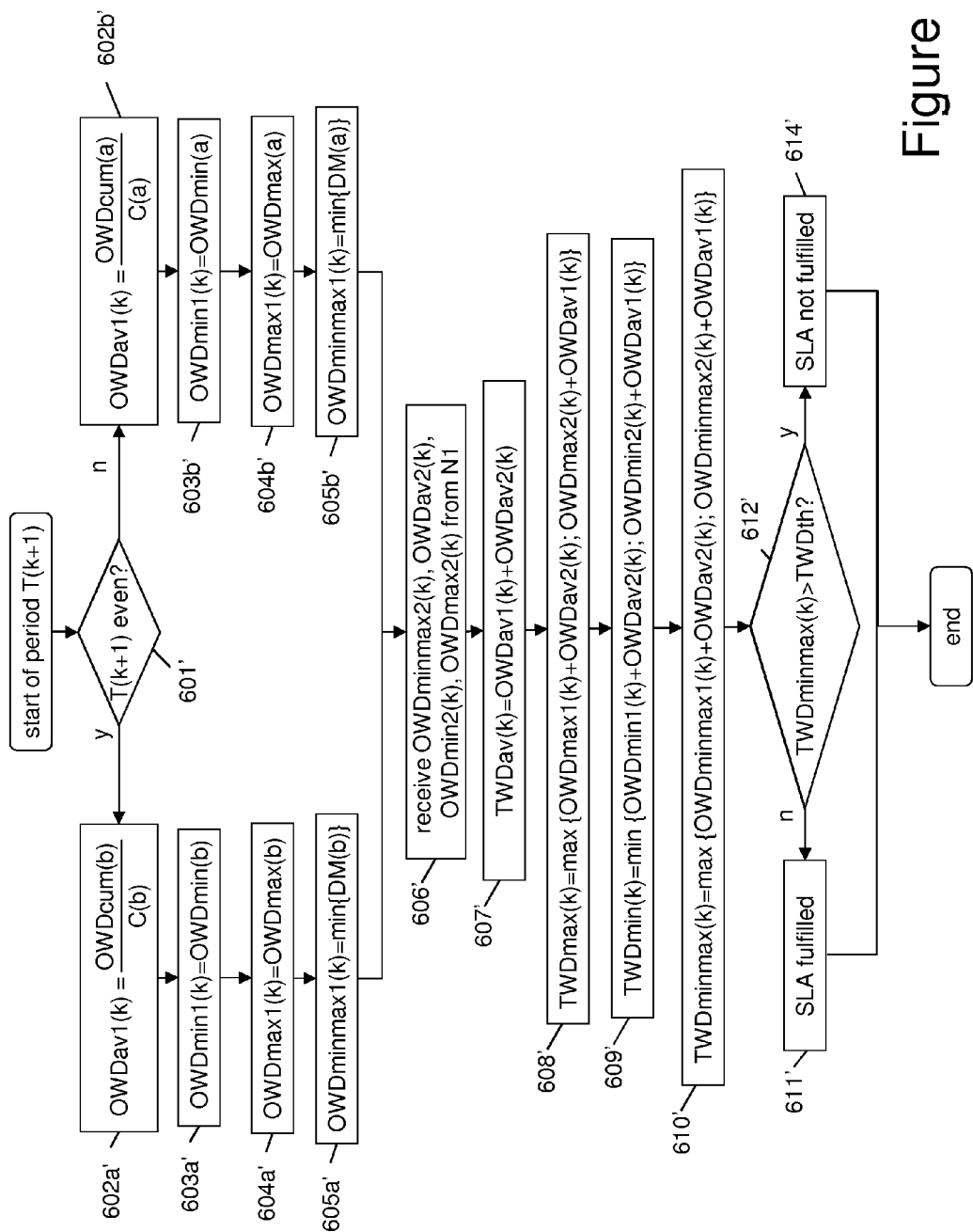
FIG. 10 is a second flow chart of the method according to a further embodiment of the present invention, at the receiving side.

The operation of the nodes N1, N2 (in particular, of the second node N2) at their reception sides is shown in the flow charts of FIGS. 8, 9 and 10. For simplicity, it is assumed that the nodes N1, N2 perform only delay measurements. Packet loss and jitter measurements are avoided and, in any case, they may be carried out by each node N1, N2 as shown in FIGS. 4, 5b and 6.

As the time $T_{loc}$ indicated by the local clock of the second node N2 equals the measurement start time $T_{start}$ specified in the measurement mode information, the second node N2 preferably starts executing the algorithm shown in FIG. 8.

In particular, at the beginning of each block period T(k), the second node N2 preferably determines whether the current block period T(k) is an even block period or an odd block period (step 41').

Then, if the current block period T(k) is an even block period (k=0, 2, 4, etc.), a first reception counter C(a) is preferably initialized to zero (step 42a'). Further, at step 42a', a first maximum one-way delay array DM(a), a first cumulative one-way delay OWDcum(a), a first minimum one-way delay OWDmin(a) and a first maximum one-way delay OWDmax(a) are preferably also initialized to zero.

The first maximum one-way delay array DM(a) preferably comprises Nth elements, Nth being equal to % TWDth of Nb. For instance, if Nb is equal to 100 and % TWDth is equal to 5%, the maximum one-way delay array DM(a) comprises 5 elements.

Then, the second node N2 starts receiving packets Pk of the packet flow PF1 from the first node N1. The second node N2 preferably identifies the packets Pk of the packet flow PF1 by using at least part of their destination address, at least part of their source address and, optionally, other fields of the packet header Hi (for instance, the field DSCP in case of IP packets).

Upon reception of a packet Pk of the packet flow PF1 (step 43*a'*), the first reception counter C(a) is preferably increased by 1 (step 44*a'*).

Then, the first maximum one-way delay array DM(a), the first cumulative one-way delay OWDcum(a), the first minimum one-way delay OWDmin(a) and the first maximum one-way delay OWDmax(a) are preferably updated, as it will be described in detail with reference to the flow chart of FIG. 9 (step 45*a'*).

Steps 43*a'*-45*a'* are preferably iterated each time a packet Pk of the packet flow PF1 is received, until the end of the block period T(k) (step 47*a'*).

If, at step 41, it is determined that the current block period T(k) is an odd block period (k=1, 3, 5, etc.), a second reception counter C(b) is preferably initialized to zero (step 42*b'*). Further, at step 42*b'*, a second maximum one-way delay array DM(b), a second cumulative one-way delay OWDcum(b), a second minimum one-way delay OWDmin(b) and a second maximum one-way delay OWDmax(b) are preferably also initialized to zero. The second maximum one-way delay array DM(b) preferably comprises Nth elements, similarly to the first maximum one-way delay array DM(a).

Upon reception of each packet Pk of the packet flow PF1 (step 43*b'*), the second reception counter C(b) is preferably increased by 1 (step 44*b'*).

Then, the second maximum one-way delay array DM(b), the second cumulative one-way delay OWDcum(b), the second minimum one-way delay OWDmin(b) and the second maximum one-way delay OWDmax(b) are preferably updated, as it will be described in detail with reference to the flow chart of FIG. 9 (step 45*b'*).

Steps 43*b'*-45*b'* are preferably iterated each time a packet Pk of the packet flow PF1 is received, until the end of the block period T(k) (step 47*b'*).

The flow chart of FIG. 8 is iterated for each block period T(k), until the time $T_{loc}$ indicated by the local clock of the second node N2 equal the measurement stop time $T_{end}$ specified in the measurement mode information.

FIG. 9 shows in further detail step 45*a'* (and 45*b'*). At step 45*i'* ("i" being equal to either "a" if T(k) is an even block period or "b" if T(k) is an odd block period), the one-way delay OWD(i) of the packet Pk is preferably calculated as a difference between the reception time Trx of the packet Pk as indicated by the local clock of the second node N2 and a transmission time Ttx of the same packet Pk by the first node N1 (step 501'). The above considerations about step 501 apply to step 501', mutatis mutandis.

Then, it is checked whether the one-way delay OWD(i) calculated at step 501' is higher than the minimum value amongst the Nth values stored by the maximum one-way delay array DM(i) ("i" being equal to either "a" if T(k) is an even block period or "b" if T(k) is an odd block period) (step 502'). In the affirmative, the minimum value of the maximum one-way delay array DM(i) is overwritten by the one-way delay OWD(i) calculated at step 501' (step 503'). In the negative, the maximum one-way delay array DM(i) is left unchanged. Preferably, step 503' also comprises sorting the maximum one-way delay array DM(i) according to either an ascending or descending order, in order to ease the identification of the minimum value of the maximum one-way delay array DM(i) at the next iteration of step 502'.

Then, the cumulative one-way delay OWDcum(i), the minimum one-way delay OWDmin(i) and the maximum one-way delay OWDmax(i) initialized at step 42*i* ("i" being equal to either "a" if T(k) is an even block period or "b" if T(k) is an odd block period) are updated (steps 504' to 508*a'*). Steps 504' to 508*a'* basically correspond to steps 504 to 508*a* of FIG. 5. Hence, a detailed description will not be repeated.

Hence, at the end each block period T(k), the maximum one-way delay array DM(i) stores the one-way delays of the Nth "slowest" packets Pk transmitted and received during the block period T(k), the cumulative one-way delay OWDcum(i) stores the sum of all the one-way delays undergone by the packets Pk transmitted and received during the block period T(k), the minimum one-way delay OWDmin(i) stores the one-way delay undergone by the "fastest" packet Pk transmitted and received during the block period T(k), while the maximum one-way delay OWDmax(i) stores the one-way delay undergone by the "slowest" packet Pk transmitted and received during the block period T(k), "i" being equal to either "a" if T(k) is an even block period (k=0, 2, 4, etc.) or "b" if T(k) is an odd block period (k=1, 3, 5, etc.).

Referring now to FIG. 10, at the beginning of the successive block period T(k+1), it is determined whether the block period T(k+1) is an even or odd block period (step 601').

If the block period T(k+1) is an even block period (k=0, 2, 4, etc.), it is determined that the values of the variables relating to packets marked by Va may be currently changing, whereas the values of the variables relating to packets marked by Vb are currently constant and may accordingly be used for providing performance measurements relating to the block period T(k).

Hence, an average one-way delay OWDav1($k$) is preferably calculated as the value of the second cumulative one-way delay OWDcum(b) at the end of the block period T(k) divided by the value of the second reception counter C(b) at the end of the block period T(k) (step 602*a'*). Further, a minimum one-way delay OWDmin1($k$) is preferably set equal to the value of the second minimum one-way delay OWDmin(b) at the end of the block period T(k) (step 603*a'*), whereas a maximum one-way delay OWDmax1($k$) is preferably set equal to the value of the second maximum one-way delay OWDmax(b) at the end of the block period T(k) (step 604*a'*). Further, a minimum maximum one-way delay OWDminmax1($k$) is preferably determined as the minimum amongst the Nth elements of the second maximum one-way delay array DM(b) at the end of the block period T(k) (step 605*a'*).

If at step 601' it is determined that the block period T(k+1) is an odd block period (k=1, 3, 5, etc.), it is determined that the values of the variables relating to packets marked by Va are currently constant and may accordingly be used for providing performance measurements relating to the block period T(k), whereas the values of the variables relating to packets marked by Vb may be currently changing.

Hence, the average one-way delay OWDav1($k$), the minimum one-way delay OWDmin1($k$), the maximum one-way delay OWDmax1($k$) and the minimum maximum one-way delay OWDminmax1($k$) relating to the block period T(k) are preferably calculated using the variables relating to packets marked by Va (steps 602b'-605b'). Steps 602b'-605b' are substantially similar to the above described steps 602a'-605a', except that they are applied to variables relating to packets marked by Va rather than to variables relating to packets marked by Vb. Hence, a detailed description will not be repeated.

While the second node N2 processes the packet flow PF1 as described above, the first node N1 processes the further packet flow PF2 in a similar way thereby providing, at the block period T(k+1), an average one-way delay OWDav2(k), a minimum one-way delay OWDmin2(k), a maximum one-way delay OWDmax2(k) and a minimum maximum one-way delay OWDminmax2(k) relating to the second packet flow PF2 during the block period T(k). The first node N1 preferably transmits such parameters to the second node N2, which receives them (step 606').

Then, the second node N2 preferably calculates an average two-way delay TWD(k) as the sum of the average one-way delay OWDav1(k) relating to the packet flow PF1 and the average one-way delay OWDav2(k) relating to the further packet flow PF2 (step 607').

Then, the second node N2 preferably calculates a maximum two-way delay TWDmax(k) (step 608') as the maximum between the two following terms:
the sum of the maximum one-way delay OWDmax1(k) relating to the packet flow PF1 and the average one-way delay OWDav2(k) relating to the further packet flow PF2; and
the sum of the maximum one-way delay OWDmax2(k) relating to the further packet flow PF2 and the average one-way delay OWDav1(k) relating to the packet flow PF1.

Optionally, at step 608' the second node N2 may also calculate a theoretical maximum two-way delay as the sum of the maximum one-way delay OWDmax1(k) relating to the packet flow PF1 and the maximum one-way delay OWDmax2(k) relating to the further packet flow PF2.

Then, the second node N2 preferably calculates a minimum two-way delay TWDmin(k) (step 609') as the minimum between the two following terms:
the sum of the minimum one-way delay OWDmin1(k) relating to the packet flow PF1 and the average one-way delay OWDav2(k) relating to the further packet flow PF2; and
the sum of the minimum one-way delay OWDmin2(k) relating to the packet flow PF2 and the average one-way delay OWDav1(k) relating to the packet flow PF1.

Optionally, at step 609' the second node N2 may also calculate a theoretical minimum two-way delay as the sum of the minimum one-way delay OWDmin1(k) relating to the packet flow PF1 and the minimum one-way delay OWDmin2(k) relating to the packet flow PF2.

Then, the second node N2 preferably calculates a minimum maximum two-way delay TWDminmax(k) (step 610') as the maximum between the two following terms:
the sum of the minimum maximum one-way delay OWDminmax1(k) relating to the first flow PF1 and the average one-way delay OWDav2(k) relating to the further packet flow PF2; and
the sum of the minimum maximum one-way delay OWDminmax2(k) relating to the second packet flow PF2 and the average one-way delay OWDav1(k) relating to the packet flow PF1.

The second node N2 then preferably determines whether the minimum maximum two-way delay TWDminmax(k) calculated at step 610' is higher than the threshold two-way delay TWDth specified in the measurement mode information (step 611'). In the negative, it is determines that the SLA stipulated between network operator and customer is fulfilled (step 612'), in that less than % TWDth packets exhibit a two-way delay higher than the threshold two-way delay TWDth. Otherwise, it is determines that the SLA stipulated between network operator and customer is not fulfilled (step 614'), in that more than % TWDth packets exhibit a two-way delay higher than the threshold two-way delay TWDth.

The two-way delay measurements carried out according to the flow chart of FIG. 10 are advantageously not affected by possible mismatch between the local clocks of the first node N1 and the second node N2. Indeed, the additions between one-way delay measurements carried out at steps 607', 608', 609' and 610' advantageously compensate such mismatch, since the two one-way delay measurements involved in each addition are affected by errors having a same modulus and opposite signs (positive and negative).

It shall be further noticed that the maximum two-way delay, minimum two-way delay and minimum maximum two-way delay calculated at steps 608', 609' and 610' do not provide the same result as known round-trip delay measurements. Indeed, in such known methods the round-trip or two-way delay is calculated for each single packet transmitted back and forth along the link L, by adding the one-way delays undergone by the same packet upon its transmission along the two opposite direction of the link. The two-way delay measurements according to embodiments of the present invention is instead based on the addition of one-way delay metrics relative to distinct, counter propagating packet flows PF1, PF2. The Applicant has estimated that this approach provides sufficiently accurate results, the introduced inaccuracy being comparable to that of known round-trip delay measurement methods.

Furthermore, although the two-way delay measurements as described above require an exchange of information between the first node N1 and the second node N2, very few information need to be exchanged at each block period (see step 606'). Hence, such an exchange of information advantageously entails a minimum bandwidth consumption on the link L.

The performance measurement methods described above comprises marking the packets Pk of the packet flow PF1 (and PF2), and in particular periodically changing the marking value for dividing the packet flow PF1 (and PF2) in blocks. This is however not limiting. Indeed, according to alternative embodiments of the present invention, the packet flow PF1 (and PF2) may be divided in blocks without marking the packets Pk. In particular, according to a preferred embodiment, the first node N1 may periodically insert in the packet flow PF1 an additional packet which marks the edge between a block period T(k) and the subsequent block period T(k+1). In such case, the one-way delay measurements needed at the second node N2 for carrying out the two-way delay measurements as shown in FIG. 10 may be advantageously transmitted to the second node N2 within such delimiting packets.

In general, in the time measurement method of the present invention, the packet flow PF1 (and PF2) may be divided in blocks by any technique, provided such technique allows identification of even block periods and odd block periods alternating in time. This allows implementing a double set of variables relating to packets transmitted during even and odd block periods. This way, at each block period T(k), one set of variables is varying while the other set of variables has fixed value and may accordingly be for calculating the average timestamps, average delay and average jitter as described above.

As mentioned above, the performance measurements described above may be carried out either by the nodes N1, N2 themselves or by dedicated computers connected to the nodes. Indeed, in some cases it may be undesirable or even impossible to implement the above described methods at the nodes. This is the case, for instance, when the nodes of the communication network do not comprise the basic functionalities required to support the execution of the method steps, or when the nodes are of different vendors and, accordingly, their reconfiguration would be a very long and costly operation. In such situations, according to alternative embodiments of the present invention, at least some of the method steps are carried out by dedicated computers connected to the nodes.

According to first variants of the above described embodiments, the first node N1 and the second node N2 are connected to respective computers PC1, PC2, which are interposed between the nodes N1, N2 along the link L. In other words, the computers PC1 and PC2 are pass-through probes located in intermediate positions along the path followed by the packet flow PF1 between the first node N1 and the second node N2. According to such first variants, the first node N1 generates, marks and transmits the packet flow PF1 according to the flow chart of FIG. 3, whereas all the processing steps of the further packet flow PF2 transmitted by the second node N2 are preferably carried out by the computer PC1. Symmetrically, the second node N2 generates, marks and transmits the further packet flow PF2 according to the flow chart of FIG. 3, whereas all the processing steps of the packet flow PF1 transmitted by the first node N1 are preferably carried out by the computer PC2. In other words, according to this first variant the nodes N1, N2 do not perform any performance measurement operation, which is completely in charge to the computers PC1, PC2. The computers PC1, PC2 basically implements all the traffic processing functions of a node, plus the performance measurements functions. Hence, the performance measurement may be implemented independently of the functionalities available at the nodes N1, N2.

According to second variants of the above described embodiments, the first node N1 is preferably connected to a first computer PC1 from which it receives the packet flow PF1 and to which it forwards the further packet flow PF2. Besides, the receiving node N2 is preferably connected to a second computer PC2 to which it forwards the packet flow PF1 and from which it receives the further packet flow PF2. According to this second variants, the first computer PC1 generates, marks and transmits the packet flow PF1 according to the flow chart of FIG. 3 and moreover carries out all the processing steps of the further packet flow PF2 transmitted by the second node N2. Symmetrically, the second computer PC2 generates, marks and transmits the further packet flow PF2 according to the flow chart of FIG. 3 and moreover carries out all the processing steps of the packet flow PF1 transmitted by the first node N1. In other words, the computers PC1, PC2 provide the ad hoc or artificial packet flows PF1, PF2 which, between the nodes N1 and N2, are mixed with real traffic exchanged by the nodes N1 and N2. Also according to this second variants, the nodes N1 and N2 do not perform any operation supporting the performance measurement, which is completely in charge to the computers PC1, PC2.

According to other embodiments not shown in the drawings, in case the link L is a logical link that passes through at least one node intermediate between the first node N1 and the second node N2, the end-to-end performance measurements of the link L as described above may be combined with intermediate performance measurements, namely performance measurements relating to one or more portions of the link L. Such intermediate performance measurements preferably provide a packet loss measurement and/or a one-way delay measurement and/or a one-way jitter measurement of the measured portion of link L. In case a performance degradation is detected in the end-to-end performance measurements of the link L, the intermediate performance measurements allow localizing the link portion where the problem originating the end-to-end performance degradation arose.

Preferably, the intermediate performance measurements are carried out by two measurement points which are implemented at two nodes which terminate the portion of link L to be measured at its opposite ends. Both the measurement points may be implemented at intermediate nodes of the link. Alternatively, one of the two measurement points may be implemented at one of the first node N1 or second node N2. The two measurement points may be implemented at adjacent nodes (in such case, the measured portion of the link L is the physical connection between the two nodes). Alternatively, the two measurement points may be implemented at non adjacent nodes (in such case, the measured portion of link L is a logical connection including multiple adjacent physical connections linking the two nodes).

Each measurement point may be implemented either within the node itself, or by a computer connected to the node. In case a measurement point is implemented within the node, such node is preferably configured to identify the packet flow PF1 and carry out the measurement on the packet flow PF1. In case a measurement point is implemented by a computer connected to the node, the computer may be connected to the node either in a pass-through configuration (namely, the packet flow PF1 passes through the computer) or a non pass-through configuration (namely, the node is connected to the computer through a port different from that one used for transmitting or receiving the packet flow PF1 along the link L). In the first case, the computer is preferably configured to identify the packet flow PF1 and carry out the measurement on the packet flow PF1. In the second case, the node is preferably configured to identify the packet flow PF1, create a copy of the packet flow PF1 and forward the copy to the computer. The computer is in turn preferably configured to carry out the intermediate measurement on the copy of the packet flow PF1.

The intermediate performance measurements of a portion of the link L preferably comprise a packet loss measurement of the link portion. The packet loss measurement is preferably similar to that described by the above mentioned WO 2010/072251 (in the name of the same Applicant), except that it is carried out by the measurement points on artificial traffic (namely, the packet flow PF1) and not on real traffic.

More particularly, the first measurement point preferably counts, for each block period $T(k)$, the number of packets Pk of the packet flow PF1 transmitted during the current block period $T(k)$. Besides, the second measurement point preferably counts, for each block period $T(k)$, the number of packets Pk of the packet flow PF1 received during the current block period $T(k)$. At the subsequent block period $T(k+1)$, the counts of packets transmitted and received during the preceding block period $T(k)$ are gathered (e.g. by the network manager NM) from the two measurement points and the data loss at the preceding block period T(k) is calculated as a difference between transmitted packet count and received packet count.

Furthermore, the intermediate performance measurements of a portion of the link L preferably comprise a time measurement, in particular a one-way delay and/or a one-way jitter measurement. The time measurement is preferably similar to that described by the above mentioned WO 2011/079857 (in the name of the same Applicant), except that it is carried out on artificial traffic (namely, the packet flow PF1) and not on real traffic.

More particularly, the first measurement point preferably generates, during each block period T(k), one or more transmission timestamps indicating the time(s) at which one or more predefined packets Pk of the packet flow PF1 are transmitted (e.g. the first packet Pk of the current block period T(k)). The second measurement point besides generates, during each block period T(k), one or more reception timestamps indicating the time(s) at which the one or more predefined packets Pk of the packet flow PF1 are received. At the subsequent block period T(k+1), the transmission and reception timestamps generated during the preceding block period T(k) are gathered (e.g. by the network manager NM) from the two measurement points and the one-way delay affecting each one of the one or more predefined packets Pk on the link portion during the preceding block period T(k) is calculated as a difference between reception timestamp and transmission timestamp of that predefined packet. If the one or more predefined packets Pk comprise two consecutive packets Pk for each block period T(k), transmission and reception timestamps generated for such consecutive predefined packets Pk allow calculation of the one-way jitter.

Furthermore, the intermediate performance measurements of a portion of the link L preferably comprise an average time measurement, in particular an average one-way delay and/or an average one-way jitter measurement.

More particularly, by referring first to average one-way delay measurements, for each block period T(k) the first measurement point preferably counts the number of packets Pk transmitted during the block period T(k) and provides a cumulative transmission timestamp equal to the sum of the transmission times of all the packets Pk transmitted during the block period T(k). The second measurement point, for each block period T(k), preferably counts the number of packets Pk received during the block period T(k) and provides a cumulative reception timestamp equal to the sum of the reception times of all the packets Pk received during the block period T(k). At the subsequent block period T(k+1), the numbers of transmitted and received packets as well as the cumulative transmission and reception timestamps generated during the preceding block period T(k) are gathered (e.g. by the network manager NM) from the two measurement points and the average one-way delay affecting packets Pk on the link portion during the preceding block period T(k) is calculated based on such parameters, namely as a difference between an average reception timestamp (equal to cumulative reception timestamp divided by number of received packets) and average transmission timestamp (equal to cumulative transmission timestamp divided by number of transmitted packets).

By referring now to average one-way jitter measurements, for each block period T(k) the first measurement point preferably counts the number of packets Pk transmitted during the block period T(k) and provides two transmission timestamps indicating the transmission times of last and first packets Pk transmitted during the block period T(k). The second measurement point besides for each block period T(k) preferably counts the number of packets Pk received during the block period T(k) and provides two reception timestamps indicating the reception times of the last and first packets Pk received during the block period T(k). At the subsequent block period T(k+1), the numbers of transmitted and received packets as well as the two transmission timestamps and the two reception timestamps generated during the block period T(k) are gathered (e.g. by the network manager NM) from the two measurement points and the average one-way jitter affecting packets Pk on the link portion during the preceding block period T(k) is calculated based on such parameters, namely as a difference between an average one-point reception jitter (in turn calculated as a difference between the two reception timestamps divided by the number of received packets decreased by 1) and average one-point transmission jitter (in turn calculated as a difference between the two transmission timestamps divided by the number of transmitted packets decreased by 1).

Performing such intermediate performance measurements on the artificial traffic flow PF1 rather than on real traffic is advantageous in that, as mentioned above with reference to the end-to-end performance measurements, it provides to the network operator a full control of the traffic to be measured, so that: the packet transmission rate may be adapted to the computational resources available at the measurement points, reception sequence errors may be prevented by suitably tailoring the packet transmission rate and the artificial packets may be customized in a very flexible way, while leaving real traffic unaffected.

The invention claimed is:

1. A method for performing a performance measurement of a link connecting a first node and a second node of a communication network, the method comprising:
   a) before starting a performance measurement, providing the first node and the second node with measurement mode information comprising at least a measurement start time and a packet transmission rate;
   b) at the measurement start time, generating and transmitting a packet flow from the first node to the second node, the packet flow comprising a plurality of packets whose transmission times are determined by the measurement start time and the packet transmission rate, the generating and transmitting comprising generating and transmitting first packets during first block periods and second packets during second block periods which alternate in time with the first block periods;
   c) at a block period of the first block periods or second block periods, while the packet flow is received at the second node, updating a variable indicative of a behaviour of the packet flow during the block period, by using the measurement mode information and detected information on reception of the packet flow; and
   d) at a subsequent block period of the first block periods or second block periods, calculating a parameter indicative of a performance of the packet flow during the block period using a value reached by the variable at the end of the block period.

2. The method according to claim 1, wherein b) comprises marking the first packets by a first marking value and marking the second packets by a second marking value.

3. The method according to claim 2, wherein each packet of the packet flow comprises a marking field, the marking field being set to the first marking value in the first packets and to the second marking value in the second packets, the marking field being comprised in one of a header or a payload of the packet.

4. The method according to claim 1, wherein the packet transmission rate is constant or variable in time according to a predefined traffic profile.

5. The method according to claim 2, wherein:
at a), the measurement mode information further comprises a block period duration; and
at b), the first block periods and the second block periods have a duration equal to the block period duration.

6. The method according to claim 1, wherein:
at a), the measurement mode information further comprises a packet type; and
at b), the packets are of the packet type.

7. The method according to claim 1 wherein, at a), the measurement mode information further comprises performance measurement type selected from: packet loss measurement, one-way delay measurements, one-way jitter measurements, and two-way delay measurements.

8. The method according to claim 1, wherein:
c) further comprises counting a number of packets of the packet flow received at the second node during the block period; and
at d), the calculating comprises calculating a number of packets of the packet flow transmitted by the first node during the block period based on the packet transmission rate comprised in the measurement mode information, and calculating a packet loss undergone by the packet flow during the block period based on the calculated number of packets of the packet flow transmitted by the first node during the block period and the counted number of packets of the packet flow received at the second node during the block period.

9. The method according to claim 1, wherein:
at c), the updating comprises, upon reception of each packet of the packet flow during the block period, detecting a respective reception time, calculating a respective transmission time based on the measurement start time and the packet transmission rate comprised in the measurement mode information, and calculating a respective one-way delay as a difference between the detected reception time and the calculated transmission time;
at c), the updating comprises, upon reception of each packet of the packet flow during the block period, using the respective one-way delay for updating at least one of: a cumulative one-way delay, a maximum one-way delay variable, a minimum one-way delay variable, and a threshold delay counter; and
at d), the calculating comprises using a value reached at the end of the block period by at least one of: the cumulative one-way delay, the maximum one-way delay variable, the minimum one-way delay variable, and the threshold delay counter for calculating at least one of: an average one-way delay of the packet flow during the block period, a maximum one-way delay of the packet flow during the block period, a minimum one-way delay of the packet flow during the block period, and a number or percentage of packets whose respective one-way delays are higher than a threshold one-way delay within the block period.

10. The method according to claim 1, wherein:
at c), the updating comprises, upon reception of each pair of consecutive packets of the packet flow during the block period, detecting a time lapsing between their receptions, calculating a time lapsing between their transmissions based on the packet transmission rate comprised in the measurement mode information, and calculating a respective one-way jitter based on the detected time lapsing between their receptions and the calculated time lapsing between their transmissions;
at c), the updating comprises, upon reception of each pair of consecutive packets of the packet flow during the block period, using the respective one-way jitter for updating at least one of: a maximum one-way jitter variable, a minimum one-way jitter variable, a maximum threshold jitter counter, and a minimum threshold jitter counter; and
at d), the calculating comprises using a value reached at the end of the block period by at least one of: the maximum one-way jitter variable, the minimum one-way jitter variable, the maximum threshold jitter counter, and the minimum threshold jitter counter for calculating at least one of: a maximum one-way jitter of the packet flow during the block period, a minimum one-way jitter of the packet flow during the block period, a number or percentage of pairs of consecutive packets whose respective one-way jitters are higher than a maximum threshold one-way jitter within the block period and a number or percentage of pairs of consecutive packets whose respective one-way jitters are lower than a minimum threshold one-way jitter within the block period.

11. The method according to claim 1, further comprising:
b') at the measurement start time, generating and transmitting a further packet flow from the second node to the first node, the further packet flow comprising a plurality of further packets whose transmission times are determined by the measurement start time and the packet transmission rate, the generating and transmitting comprising generating and transmitting first further packets during the first block periods and second further packets during the second block periods;
c') at the block period, while the further packet flow is received at the first node, updating a further variable indicative of a behaviour of the further packet flow during the block period, by using the measurement mode information and detected information on reception of the further packet flow; and
d') at the subsequent block period, calculating a further parameter indicative of a performance of the further packet flow during the block period using a value reached by the further variable at the end of the block period.

12. The method according to claim 11, wherein:
at d), the calculating comprises calculating a two-way performance parameter indicative of a two-way performance of the link using the parameter and the further parameter.

13. The method according to claim 1, wherein b) is performed by the first node and c) and d) are performed by the second node.

14. The method according to claim 1, wherein b) is performed by a first computer connected to the first node and c) and d) are performed by a second computer connected to the second node.

15. The method according to claim 1, further comprising performing an intermediate performance measurement of a portion of the link, the portion of the link including a first end including a first measurement point and a second opposite end including a second measurement point, the intermediate performance measurement comprising:
e) while the packet flow is transmitted from the first end of the portion of the link, at the first measurement point processing the packet flow for determining a transmission variable relating to transmission of the packet flow during the block period;

f) while the packet flow is received at the second end of the portion of the link, at the second measurement point processing the packet flow for determining a reception variable relating to reception of the packet flow during the block period;

g) at the subsequent block period, calculating a parameter indicative of a performance of the portion of the link during the block period using the transmission variable and the reception variable.

16. A node for a communication network, the node configured to:

receive measurement mode information comprising at least a measurement start time and a packet transmission rate;

receive from a further node a packet flow comprising a plurality of packets whose transmission times are determined by the measurement start time and the packet transmission rate, the packet flow comprising first packets received during first block periods and second packets received during second block periods which alternate in time with the first block periods;

at a block period of the first block periods or second block periods, while the packet flow is received, update a variable indicative of a behaviour of the packet flow during the block period, by using the measurement mode information and detected information on reception of the packet flow; and at a subsequent block period of the first block periods or second block periods, calculate a parameter indicative of a performance of the packet flow during the block period using a value reached by the variable at the end of the block period.

17. A communication network comprising a node according to claim 16.

18. A non-transitory computer readable medium comprising a computer program product for performing the method of claim 1, when run on at least one computer.

* * * * *